(12) United States Patent
Sugiura et al.

(10) Patent No.: US 10,063,722 B2
(45) Date of Patent: Aug. 28, 2018

(54) IMAGE FORMING APPARATUS CONFIGURED TO DISPLAY FUNCTION SETTING BUTTONS AND SWITCH DISPLAY MODE BETWEEN FIRST DISPLAY MODE AND SECOND DISPLAY MODE AND IMAGE RECORDING MEDIUM

(71) Applicant: Konica Minolta, Inc., Chiyoda-ku, Tokyo (JP)

(72) Inventors: Hiroshi Sugiura, Toyokawa (JP); Yuji Kawamura, Toyokawa (JP); Yoichi Kurumasa, Toyokawa (JP); Jun Kunioka, Okazaki (JP); Mie Kawabata, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/845,322

(22) Filed: Sep. 4, 2015

(65) Prior Publication Data
US 2016/0094737 A1 Mar. 31, 2016

(30) Foreign Application Priority Data
Sep. 25, 2014 (JP) ................................. 2014-195257

(51) Int. Cl.
G06K 15/02 (2006.01)
G06F 3/0482 (2013.01)
H04N 1/00 (2006.01)

(52) U.S. Cl.
CPC ..... *H04N 1/00432* (2013.01); *H04N 1/00392* (2013.01); *H04N 1/00411* (2013.01);
(Continued)

(58) Field of Classification Search
CPC ........... H04N 1/00408; H04N 1/00413; H04N 1/00424
See application file for complete search history.

(56) References Cited

U.S. PATENT DOCUMENTS

2012/0069364 A1 * 3/2012 Kodama ............. G06F 3/04817
358/1.9
2012/0069377 A1 3/2012 Narimatu et al.
(Continued)

FOREIGN PATENT DOCUMENTS

JP 2000-209383 A 7/2000
JP 2005-172948 A 6/2005
(Continued)

OTHER PUBLICATIONS

Office Action (Notification of Reason for Rejection) dated Dec. 13, 2016, by the Japanese Patent Office in corresponding Japanese Patent Application No. 2014-195257 and an English translation of the Office Action. (8 pages).

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image forming apparatus includes a controller configured to switch a display mode of a menu screen for setting between a first display mode and a second display mode. On a menu screen of the first display mode, the controller (i) determines as display object function buttons a part of function buttons of a plurality of function buttons used to call up each of detailed settings screens each related to each of a plurality of functions provided in the image forming apparatus, (ii) displays the display object function buttons to be arranged in a row in a predetermined direction, and (iii) changes and displays the display object function buttons according to a scroll operation performed by a user. On a menu screen of the second display mode, the controller displays at least a part of function buttons of the plurality of function buttons to be arranged in a grid-like manner.

21 Claims, 21 Drawing Sheets

(52) U.S. Cl.
CPC ..... *H04N 1/00424* (2013.01); *H04N 1/00501* (2013.01); *H04N 2201/0094* (2013.01)

(56) References Cited

U.S. PATENT DOCUMENTS

| | | | |
|---|---|---|---|
| 2012/0154841 A1* | 6/2012 | Sugiura | G03G 15/502 358/1.13 |
| 2012/0185456 A1 | 7/2012 | Hart et al. | |
| 2013/0321835 A1 | 12/2013 | Kawakami | |
| 2014/0078535 A1* | 3/2014 | Okada | H04N 1/00411 358/1.13 |
| 2014/0082560 A1* | 3/2014 | Okada | H04N 1/00411 715/835 |
| 2014/0145987 A1* | 5/2014 | Nishimura | H04N 1/00411 345/173 |

FOREIGN PATENT DOCUMENTS

| | | |
|---|---|---|
| JP | 2007-181993 A | 7/2007 |
| JP | 2012-68700 A | 4/2012 |
| JP | 2012-68785 A | 4/2012 |
| JP | 2013-250715 A | 12/2013 |
| JP | 2014-58113 | 4/2014 |

\* cited by examiner

*Fig.3*

| GROUP | FUNCTION INCLUDED |
|---|---|
| "BASIC SETTINGS" GROUP G1 | "COLOR"; "DENSITY"; "ORIGINAL TYPE"; "SHEET"; "ZOOM"; "DUPLEX/COMBINE"; "FINISHING" |
| "ORIGINAL" GROUP G2 | "ORIGINAL SETTINGS"; "BOOK COPY"; "SEPARATE SCAN"; "AUTO ROTATE" |
| "LAYOUT" GROUP G3 | "BOOKLET"; "BINDING MARGIN"; "IMAGE SHIFT"; "MIRROR IMAGE"; "REPEAT"; "POSTER MODE" |
| "TAILORING" GROUP G4 | "OHP INTERLEAVE"; "COVER INSERT"; "SHEET INSERT"; "CHAPTERING" |
| "IMAGE QUALITY/ DENSITY" GROUP G5 | "BKGD. REMOVAL"; "TEXT ENHANCEMENT"; "GLOSSY COPY" |

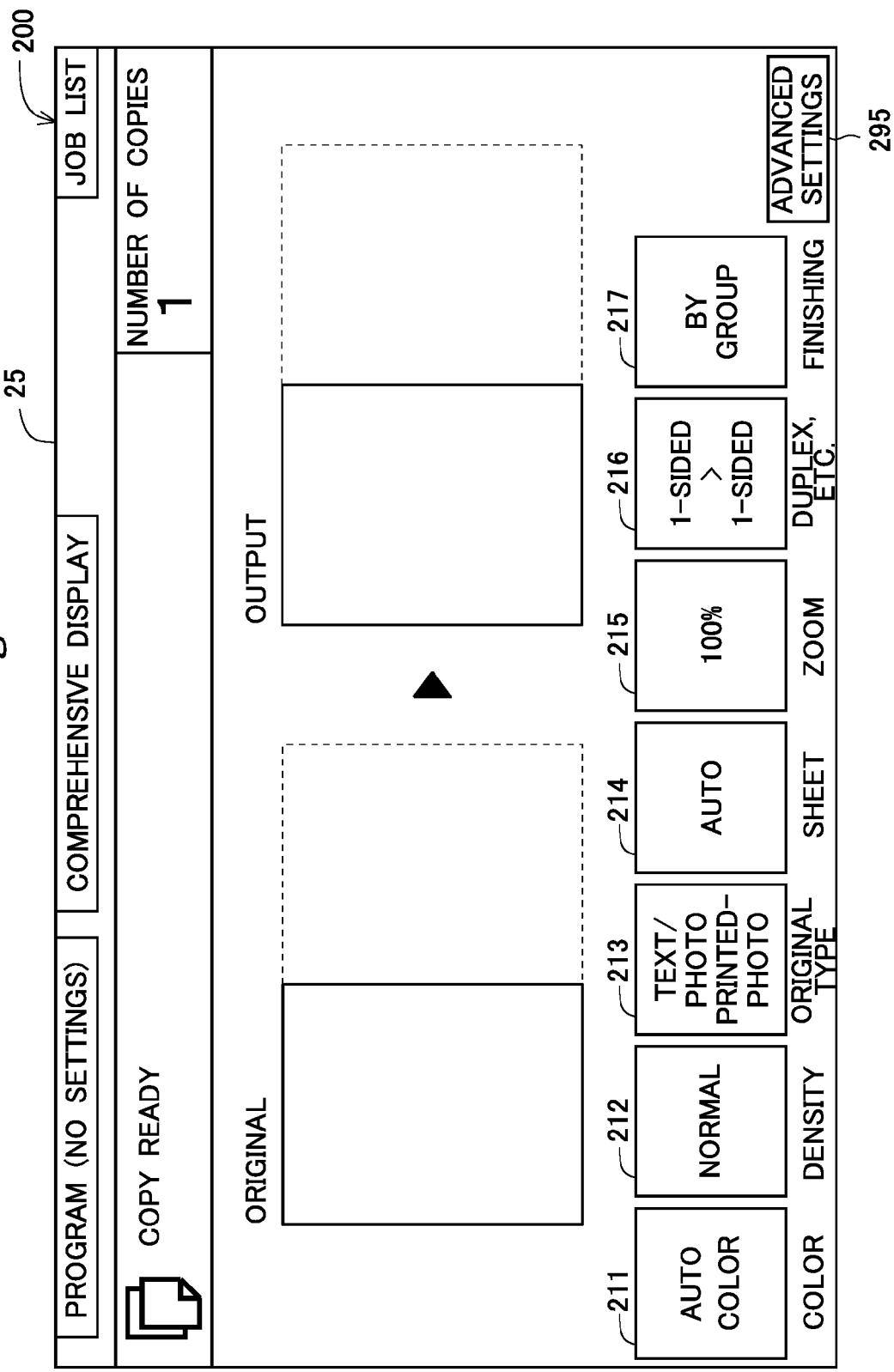

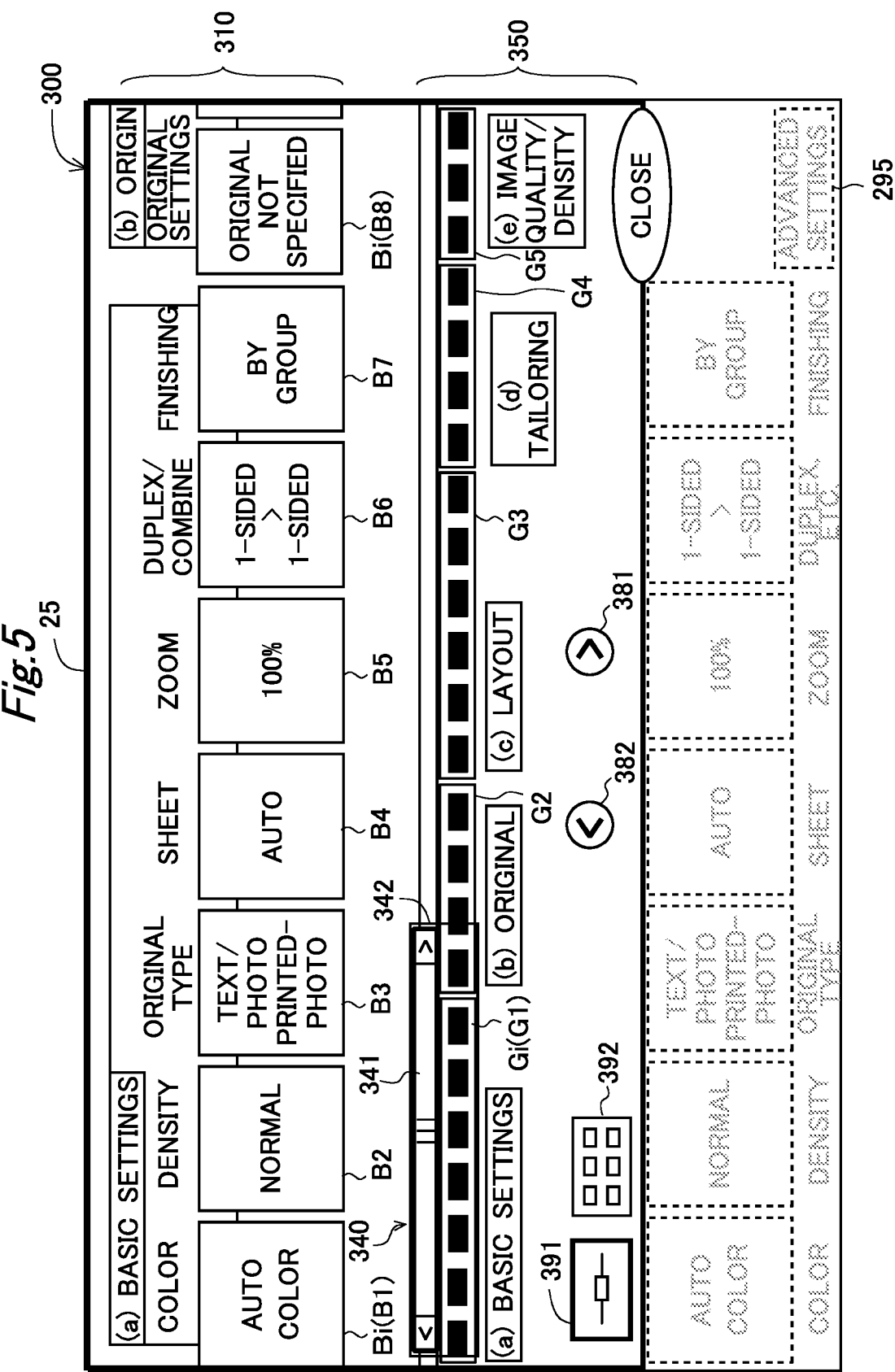

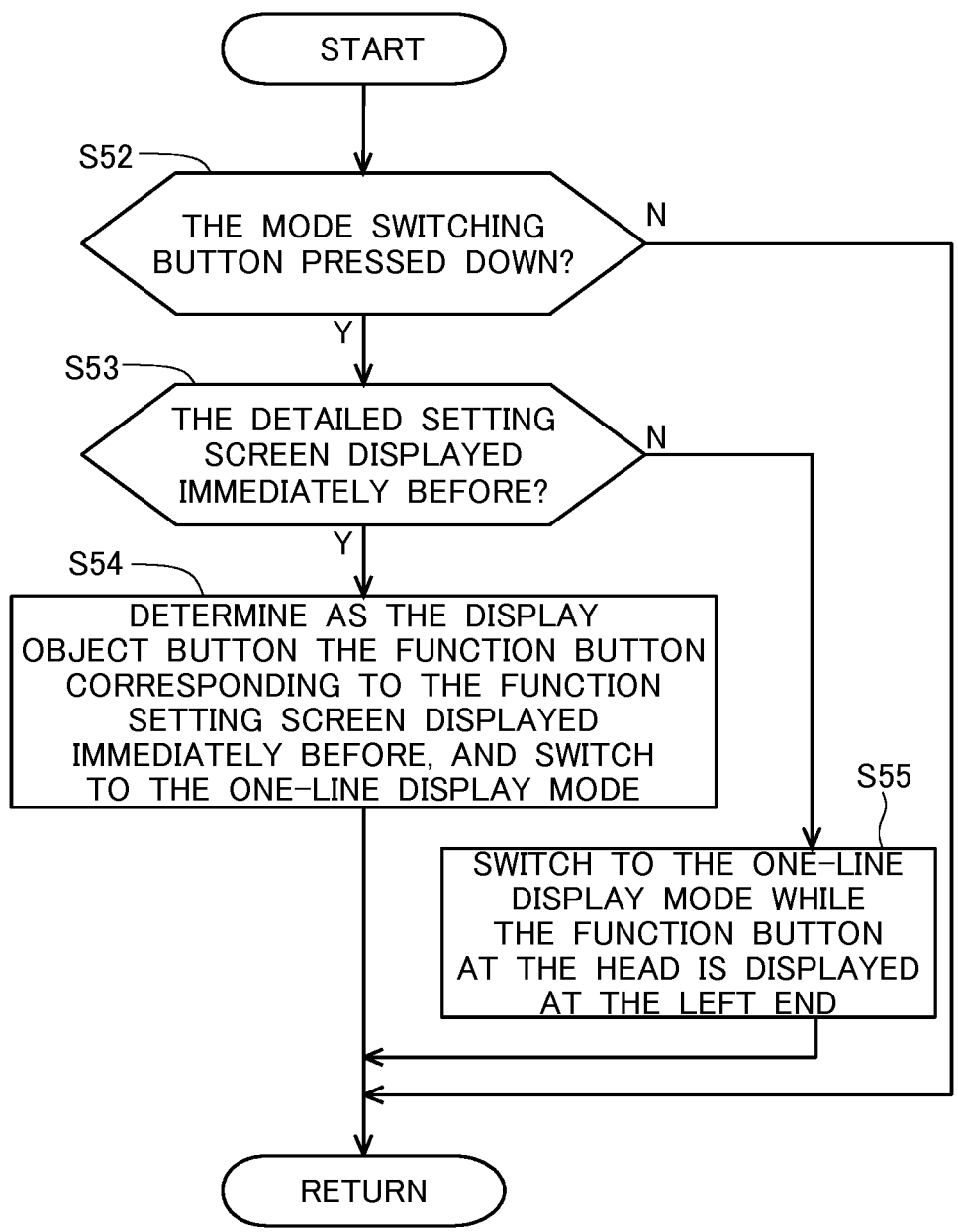

IMAGE FORMING APPARATUS CONFIGURED TO DISPLAY FUNCTION SETTING BUTTONS AND SWITCH DISPLAY MODE BETWEEN FIRST DISPLAY MODE AND SECOND DISPLAY MODE AND IMAGE RECORDING MEDIUM

This application is based on Japanese Patent Application No. 2014-195257 filed on Sep. 25, 2014, the contents of which are hereby incorporated by reference.

BACKGROUND OF THE INVENTION

Field of the Invention

The present invention relates to an image forming apparatus and technologies related thereto.

Description of the Background Art

In the image forming apparatus, the number of mounted functions is increasing year by year, and the number of setting buttons (function buttons) each corresponding to each of the functions is accordingly increasing. Therefore, it is difficult to concurrently display all of the buttons each corresponding to each of all of the functions on a menu screen of an operation panel (display unit).

To address this issue, there is a technique in which, of many buttons arranged in a row in a predetermined direction, a part of the buttons are displayed, as display object buttons, on a menu screen and in which the display object buttons are changed according to a scroll operation in the predetermined direction (such a technique will be also referred to as a "one-line scroll display technique").

For example, Japanese Patent Application Laid-Open No. 2012-68700 discloses the technique in which a part of buttons (icons) of many buttons (icons) are displayed, as display object buttons, in a row in the horizontal direction in a list display area and in which the display object buttons are changed (scroll-displayed) according to a scroll operation in the horizontal direction.

In addition, there is also a technique in which a plurality of function buttons on a menu screen are arranged in a grid-like manner (such a technique will be also referred to as a "grid-like display technique").

For example, FIG. 1 of Japanese Patent Application Laid-Open No. 2000-209383 shows total four function buttons arranged in the vertical direction and the lateral direction (two rows×two rows).

The one-line scroll display technique of the above two display techniques provides an advantage that a user only has to move his or her eye only in a predetermined direction (one direction) to find an intended button from many buttons that are arranged in a row in the predetermined direction and scroll-displayed.

However, because many buttons are displayed while being scrolled and the position of the intended button occasionally moves on the screen, the user sometimes overlooks the intended button. In addition, the one-line scroll display technique has a characteristic that visibility at a glance is not good because it is difficult to increase the number, of the buttons which can be arranged on the screen, to more than a predetermined number (for example, 10).

In contrast, in the other grid-like display technique, relatively many (for example, 20) function buttons can be concurrently displayed on the screen in a grid-like (two-dimensional) arrangement, and a relatively high visibility at a glance can be obtained. Further, in the grid-like display technique, since each of the many buttons is always displayed at the same position (unique position), the user can access an intended button relatively quickly if the user remembers the position of the intended button.

However, the grid-like display technique has an aspect that the user has to follow the existence of an intended button with his or her eyes in two directions of the lateral direction and the vertical direction when the user looks for the intended button on the menu screen and that it is not easy to follow with his or her eyes.

As described above, these two types of display techniques have advantages and disadvantages, and if one of the two types of display techniques is only used, the user cannot obtain high operability in some cases although depending on the user's preference and/or usage.

SUMMARY OF THE INVENTION

It is an object of the present invention to provide a technology which can improve user's operability of a setting screen of an image forming apparatus.

A first aspect of the present invention is an image forming apparatus including: a display unit configured to display a menu screen for setting; and a controller configured to switch a display mode of the menu screen between a first display mode and a second display mode, wherein, on a first menu screen which is the menu screen of the first display mode, the controller (i) determines as display object function buttons a part of function buttons of a plurality of function buttons used to call up each of detailed settings screens each related to each of a plurality of functions provided in the image forming apparatus, (ii) displays the display object function buttons to be arranged in a row in a predetermined direction, and (iii) changes and displays the display object function buttons according to a scroll operation performed by a user; and on a second menu screen which is the menu screen of the second display mode, the controller displays at least a part of function buttons of the plurality of function buttons to be arranged in a grid-like manner.

A second aspect of the present invention is a non-statutory computer-readable recording medium storing a program for causing a computer to execute the steps of: (a) displaying a menu screen for configuring settings related to an image forming apparatus in one display mode of two display modes which are a first display mode and a second display mode; and (b) switching a display mode of the menu screen from the one display mode to the other display mode of the two display modes, wherein, on a first menu screen which is a menu screen of the first display mode, (i) a part of function buttons of a plurality of function buttons used to call up each of detailed settings screens each related to each of a plurality of functions provided in the image forming apparatus are determined as display object function buttons, (ii) the display object function buttons are displayed to be arranged in a row in a predetermined direction, and (iii) the display object function buttons are changed and displayed according to a scroll operation performed by a user; and on a second menu screen which is a menu screen of the second display mode, at least a part of function buttons of the plurality of function buttons are displayed to be arranged in a grid-like manner.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a plurality of functions;

FIG. 4 is a diagram showing a basic settings menu screen (initial screen);

FIG. 5 is a diagram showing an advanced settings menu screen (initial screen) of a one-line display mode;

FIG. 21 is a flowchart showing an operation in a modified example.

DESCRIPTION OF THE PREFERRED EMBODIMENTS

In the following, embodiments of the present invention will be described with reference to the drawings.

1. First Embodiment

<1-1. System Outline>

Figure 1:
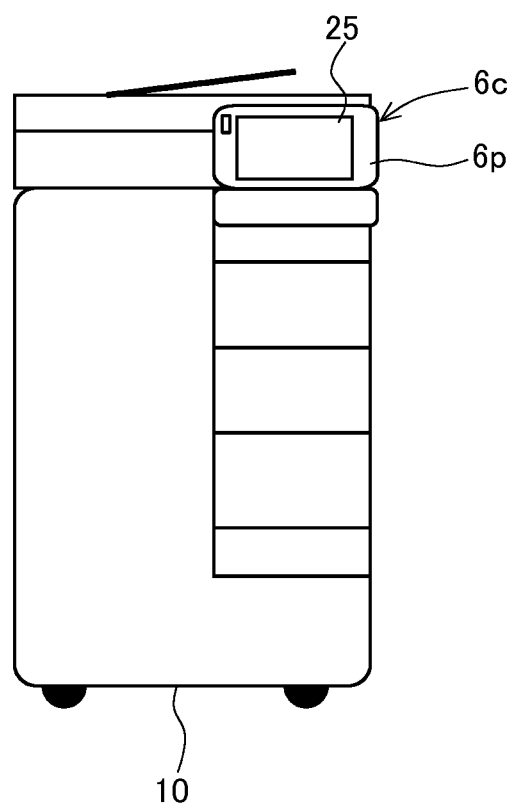
FIG. 1 is an external view showing an outer appearance of an image forming apparatus.
Figure 2:
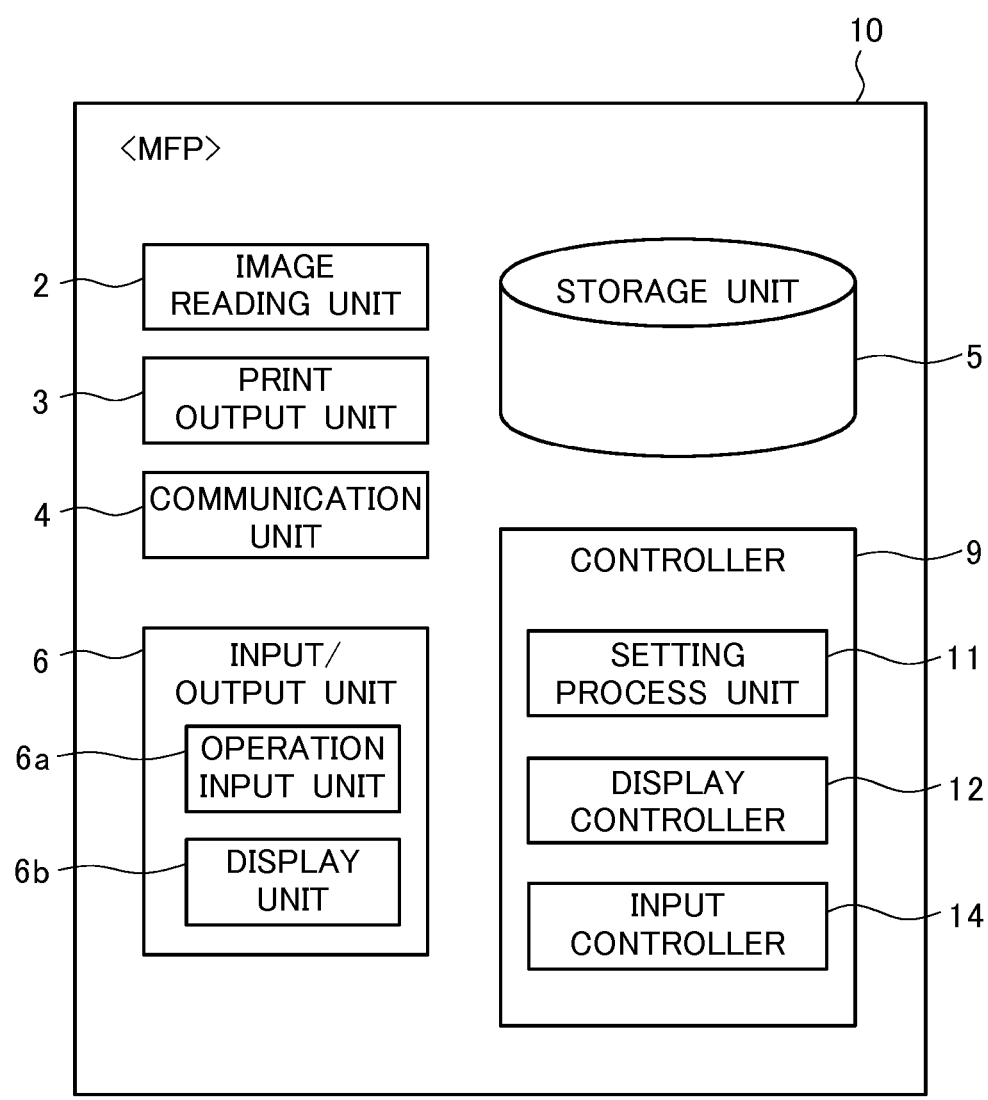
FIG. 2 is a function block diagram showing a configuration of the image forming apparatus.

FIG. 1 is an external view showing an outer appearance of an image forming apparatus 10, and FIG. 2 is a function block diagram showing a configuration of the image forming apparatus 10. In this embodiment, the image forming apparatus 10 is configured as a multi-functional peripheral (also abbreviated as MFP). The MFP is a device (also referred to as a "multifunction machine") which is equipped with a scanner function, a printer function, a copy function, a facsimile communication function, and the like.

As shown in FIG. 2, the MFP 10 is equipped with an image reading unit 2, a print output unit 3, a communication unit 4, a storage unit 5, an input/output unit 6, a controller 9, and the like, and various functions are realized by making these units operate in combination.

The image reading unit 2 is a processing unit which optically reads an original placed at a predetermined position of the MFP 10 to generate image data (to generate an image) of the original (also referred to as "original image").

The print output unit 3 is an output unit which prints and outputs an image (forms an image) on various media such as paper, based on image data of a target image.

The communication unit 4 is a processing unit which can perform a facsimile communication through a public line or the like. Further, the communication unit 4 can perform a network communication through a network NW. In this network communication, various types of protocols such as TCP/IP (Transmission Control Protocol/Internet Protocol) and FTP (File Transfer Protocol) are used, and the MFP 10 can send and receive various types of data to and from an intended destination by using the network communication.

The storage unit 5 includes a storage device such as a hard disk drive (HDD) and a non-volatile memory.

The input/output unit 6 is equipped with an operation input unit 6a configured to receive an input to the MFP 10 and with a display unit 6b configured to display and output various types of information. Specifically, the MFP 10 is equipped with an operation panel 6p (see FIG. 1) which functions as the input/output unit 6. This operation panel 6p has various hardware keys and a touch screen (touch panel) 25 (see FIG. 1).

The touch screen 25 includes a liquid display panel in which a piezoelectric sensor or the like is embedded. The touch screen 25 functions as a part of the display unit 6b and functions as a part of the operation input unit 6a. In detail, the touch screen 25 can display various types of information on the liquid display panel and can receive various inputs by detecting a position of an operation, with a finger of an operator, on the liquid display panel. For example, when a (virtual) button displayed on the touch screen 25 is touched with the finger of the operator, such an operation is taken to be a press-down operation on the button.

As described above, the input/output unit 6 can receive the input operation performed by the operator.

The controller 9 is a controller which totally controls the MFP 10 and includes a CPU and various semiconductor memories (such as RAMs and ROMs). Various functions of the MFP 10 are realized by various processing units operating under control of the controller 9. The controller 9 realizes the various processing units by executing in the CPU a predetermined software program (hereinafter, also referred to simply as a "program") stored in a ROM (for example, EEPROM). Note that the program or the like may be stored in a portable recording medium such as a USB memory (in other words, various non-statutory computer-readable recording media) and may be read out from the recording medium and installed in the MFP 10. Alternatively, the program may be downloaded through a network and installed in the MFP 10.

Specifically, the controller 9 realizes various processing units including a setting process unit 11, a display controller 12, and an input controller 14.

The setting process unit 11 is a processing unit which configures settings of various functions on the MFP 10, depending on operation inputs and the like on a setting screen displayed on the touch screen 25.

The display controller 12 is a processing unit which controls display operations and the like for displaying various screens on the touch screen 25.

The input controller 14 is a processing unit which receives an instruction input from a user. Specifically, the input controller 14 receives an instruction input from the user through various operation screens (a menu screen, a detailed settings screen, and the like) displayed on the touch screen 25 or the like.

<1-2. Basic Settings Menu and Advanced Settings Menu>

In the MFP 10, an initializing process (clearing of a memory, setting of a standard mode, and the like) is performed in response to turn-on of a power source or the like.

When the initializing process has been completed, the display controller 12 displays an initial screen 200 shown in FIG. 4 on the touch screen 25. This initial screen 200 is a screen equipped with a relatively small number of function buttons for configuring basic settings in an initial operation mode (for example, a copy mode) and is also referred to as a "basic settings menu screen."

When the basic settings menu screen 200 has been displayed, an operation input from the user is received, and a process corresponding to the operation input is performed. Specifically, if any one of function buttons 211 to 217 in the basic settings menu screen 200 is pressed down, setting operations related to various functions in the initial operation mode (for example, the copy mode) are performed. For example, if a "Sheet" button 204 is pressed down, a detailed settings screen (not shown) related to "Sheet" is displayed to be superimposed on the screen, and various setting operations (a setting operation of a sheet size and the like) related to "Sheet" are performed by using the detailed settings screen.

On the basic settings menu screen 200, it is possible only to configure the settings related to a limited number (seven in this embodiment) of basic functions. In the case of configuring settings of other functions or other cases, an advanced settings menu screen is used.

The advanced settings menu screen is displayed in response to a press-down operation of an advanced settings button 295 in the basic settings menu screen 200. This advanced settings menu screen is a screen (menu screen for setting) on which settings of more functions can be configured than on the basic settings menu screen.

In this embodiment, an aspect will be described in which two types of switching processes of the display modes are performed with respect not to the basic settings menu screen 200 but to the advanced settings menu screen.

The advanced settings menu screen is displayed in either of the two types of display modes M1 and M2 (specifically, a "one-line display mode" (M1) and a "grid display mode" (M2)). In this embodiment, at the point of time when the screen is switched from the basic settings menu screen 200 to the advanced settings menu screen (at the point of time when the advanced settings menu screen is initially displayed), the advanced settings menu screen 300 (FIG. 5 and the like) of the one-line display mode M1 of the two types of display modes M1 and M2 related to the advanced settings menu screen is initially displayed on the touch screen 25. Note that this is not restrictive, and instead of this operation the advanced settings menu screen 500 (FIG. 12 and the like) of the grid display mode M2 may be initially displayed.

In addition, as will be described later, when the screen has been switched from the one-line display mode M1 to the grid display mode M2, the advanced settings menu screen 500 different from the advanced settings menu screen 300 is displayed on the touch screen 25 in the grid display mode M2.

<1-3. One-Line Display Mode>

In the following, the advanced settings menu screen 300 and the like of the one-line display mode M1 will be described. Note that, as will be described later, the one-line display mode M1 is also expressed as a "one-line scroll display mode" because the one-line display mode M1 is a mode in which an intended function button is looked for, by using a scroll operation, from a plurality of function buttons Bi, which are arranged in a row.

FIG. 5 is a diagram showing the advanced settings menu screen 300 of the one-line display mode M1. This advanced settings menu screen 300 is displayed to be superimposed on the basic settings menu screen 200. In FIG. 5, the advanced settings menu screen 300 in the front side is active, and the basic settings menu screen 200 in the back side is inactive.

As shown in FIG. 5, there is provided a button display area 310 on the upper side in the advanced settings menu screen 300.

In this button display area 310, there are displayed in a row in the horizontal direction a part of function setting buttons (also referred to simply as "function buttons") (in FIG. 5, the eight function buttons B1 to B8 are shown) of a plurality of function setting buttons Bi (in this embodiment, i=1, 2, . . . , 24). In detail, of the plurality of function buttons Bi, which are virtually arranged in the horizontal direction (in the lateral direction), a part of function buttons (a predetermined number (eight, here) of function buttons determined as display objects) in a display object range are displayed in the button display area 310 as display object buttons (the display object function buttons). The plurality of function buttons Bi are each provided corresponding to each of a plurality of functions mounted on the MFP 10.

In the initial state, of the plurality of function buttons Bi virtually arranged in the horizontal direction, the total eight function buttons B1 to B8 (the function button B1 on the left end and the other seven function buttons B2 to B8) are determined as the display object function buttons and displayed in the button display area 310. As to be described later, the function buttons Bi to be displayed in the button display area 310 are changed in response to a scroll operation of the user.

Further, as will be described later, when the user selects and presses down an intended function button Bi of a plurality of function buttons, there is displayed (pop-up displayed) a function setting screen (referred to as the "detailed settings screen") related to the pressed down function button Bi. In other words, the plurality of function buttons Bi are the buttons each of which is used to call up each function setting screen (detailed settings screen) related to each of the plurality of functions mounted on the MFP 10.

In addition, as shown in FIG. 5, an icon display area 350 is provided below the button display area 310.

In the icon display area 350, there are displayed in a row in the horizontal direction a plurality of icons (represented by the relatively small rectangular areas (black rectangles) in the drawing) corresponding to the plurality of function buttons Bi for setting the functions. In this icon display area 350, the plurality of icons are displayed to be classified into a plurality of function groups (also expressed simply as "groups"), depending on each function (in detail, the icons are put together in each function group).

In this embodiment, an aspect will be exemplified in which a plurality (24, here) of functions are classified, depending on their attributes, into a plurality (five, here) of groups G1 to G5 ("Basic Settings" group, "Original" group, "Layout" group, "Tailoring" group, and "Image Quality/Density" group). Specifically, as described also in FIG. 3, seven functions ("Color," "Density," "Original Type (Original Image Quality)," "Sheet," "Zoom (Magnification)," "Duplex/Combine," and "Finishing") belong to the "Basic Settings" group G1. Further, four functions ("Original Settings," "Book Copy," "Separate Scan," and "Auto Rotate (Automatic Image Rotation)") belong to the "Original" group G2, and six functions ("Booklet," "Binding Margin," "Image Shift," "Mirror Image," "Repeat," and "Poster Mode") belong to the "Layout" group G3. In addition, four functions ("OHP Interleave," "Cover Insert," "Sheet Insert," and "Chaptering") belong to the "Tailoring" group G4, and three functions ("Background Removal (Bkgd. Removal)," "Text Enhancement," and "Glossy Copy") belong to the "Image Quality/Density" group G5.

As a result of these classifications, the total 24 icons corresponding to the total 24 functions are classified (categorized) into the plurality of groups G1 to G5, based on the attributes of the corresponding functions. Similarly, the total 24 function buttons Bi corresponding to the total 24 functions are also classified (categorized) into the plurality of groups G1 to G5, depending on the attributes of the corresponding functions. Note that the plurality of groups G1 to G5 are also expressed as groups for classification of the function buttons (and icons) or expressed as classification destination groups.

Then, in the above icon display area 350, the total 24 icons corresponding to the above "24" functions are displayed in the horizontal direction, being arranged in an approximately straight line and being put together in each function group. For example, the seven icons on the left end in the icon display area 350 each correspond to each of the seven functions ("Color," "Density," "Original Type (Original Image Quality)," "Sheet," "Zoom," "Duplex/Combine," and "Finishing") of the Basic Settings group G1. On the right side of the seven icons, there are arranged the four icons each corresponding to each of the four functions of the Original group G2. Similarly, on the further right side, there are arranged the six icons each corresponding to each of the six functions of the Layout group G3. On the further right side, there are sequentially arranged in the horizontal direction the four icons each corresponding to each of the four functions of the Tailoring group G4 and the three icons each corresponding to each of the three functions of the Image Quality/Density group G5. In this manner, all the 24 icons are displayed in the icon display area 350 to be classified (categorized) in the plurality of groups, depending on the attributes of the functions of the corresponding function buttons Bi.

In addition, this advanced settings menu screen 300 is equipped with a slider 340. The slider 340 is disposed in the icon display area 350 and right above the plurality of icons. The slider 340 is equipped with a slide bar 341 and a frame 342 as shown in FIG. 5. The frame 342 is a (virtual) member surrounding the icons, which correspond to the display object buttons in the button display area 310, of the above plurality of icons. The slide bar 341 is a (virtual) member to be a target of the press-down operation of a finger of the user or other objects.

The slider 340 can move in the horizontal direction in response to receiving a moving instruction operation (an operation of moving by using the slide bar 341) from the user, and the function buttons in the button display area 310 are scrolled according to the movement of the slider 340. For example, when the slide bar 341 is gradually moved to the right by a user's operation, the function buttons Bi in the button display area 310 are gradually moved (scrolled) to the left. In other words, the buttons located relatively on the right side in the button display area 310 will be sequentially selected (determined) as new display object buttons.

As described above, in the button display area 310, a scroll display is performed according to the scroll operation using the slider 340. Specifically, the movement of the slider 340 from the left end to the right end changes the display content of the button display area 310 from the state of including the function button B1, which is at the left end, of the plurality of function buttons Bi virtually arranged in a row to the state of including the function button B24 at the right end. To the contrary, the movement of the slider 340 from the right end to the left end changes the display content of the button display area 310 from the state of including the function button B24, which is at the right end, of the plurality of function buttons Bi virtually arranged in a row to the state of including the function button B1 at the left end.

Figure 6:
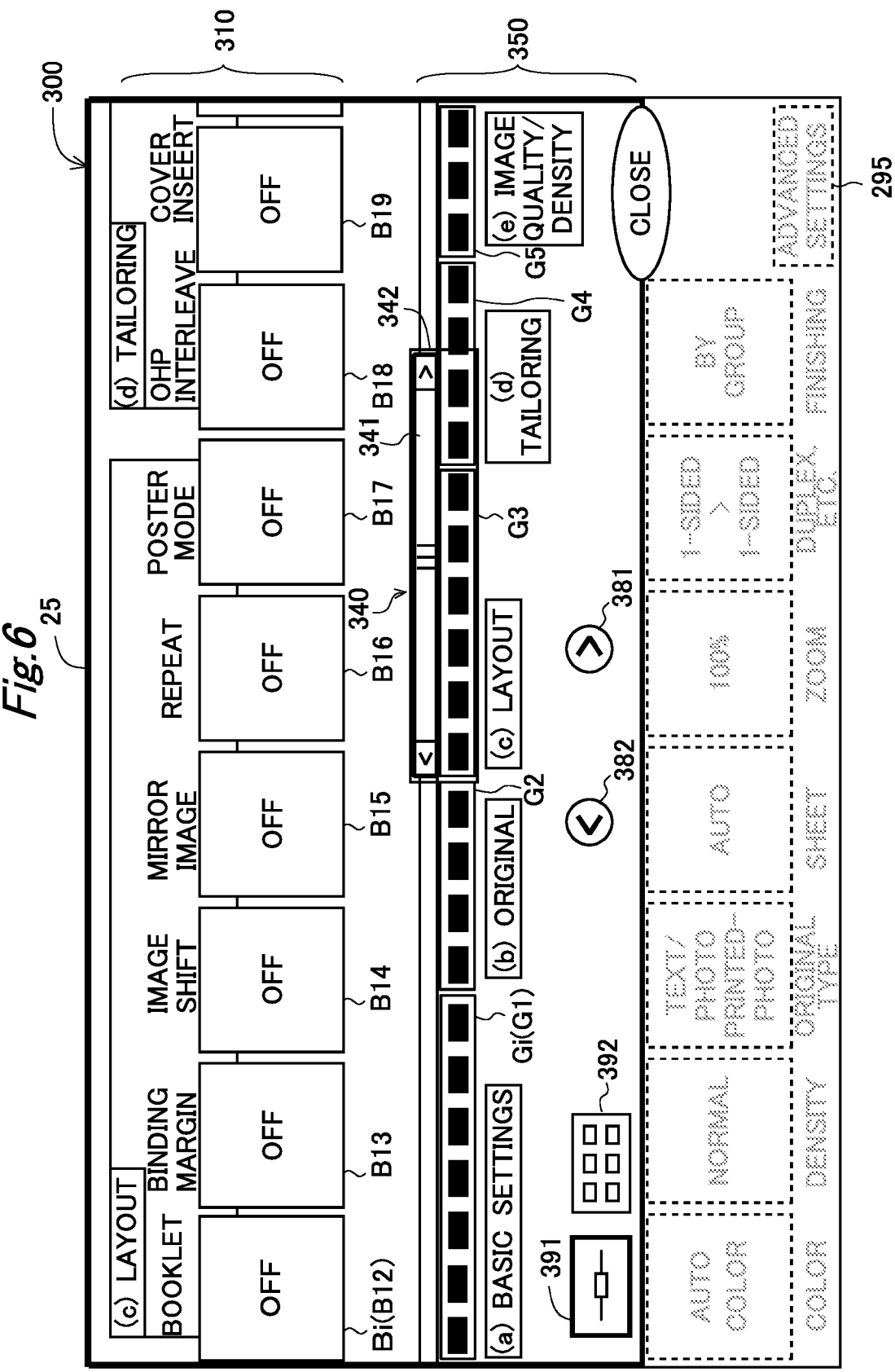
FIG. 6 is a diagram showing the advanced settings menu screen after a scroll operation in the one-line display mode.

For example, FIG. 6 shows the advanced settings menu screen 300 changed by the moving operation of the slider 340 (specifically, the operation of moving the left end of the slider 340 to the vicinity of the center of the screen) or other operations. In FIG. 6, the eight function buttons including the six function buttons Bi of the "Layout" group G3 are displayed as the display object buttons in the button display area 310.

In addition, on the advanced settings menu screen 300, there are provided a moving instruction input key 381 and a moving instruction input key 382.

The user can perform the scroll display (change of the display object buttons) in the button display area 310 by using these keys 381 and 382.

The moving instruction input key 381 receives a scroll instruction input for causing the display object range to move to the right, the display object range being for a part of function buttons Bi to be displayed in the button display area 310. When the moving instruction input key 381 is pressed down by the user, the part of function buttons Bi in the button display area 310 are scrolled to the left by a certain distance (for example, by the distance for one function button Bi), and a new part of function buttons Bi are displayed at the positions from which the function buttons have been moved. Note that the function buttons Bi are scroll-moved in the direction opposite to the direction in which the display object range is moved.

The moving instruction input key 382 receives a scroll instruction input which is in the direction opposite to the direction of the scroll instruction input which the moving instruction input key 381 receives. Specifically, the moving instruction input key 382 receives the scroll instruction input for causing the display object range to move to the left, the display object range being for the part of function buttons Bi to be displayed in the button display area 310. When the moving instruction input key 382 is pressed down by the user, the part of function buttons Bi in the button display area 310 are moved in this case to the right by a certain distance (for example, by the distance for one function button Bi), and a new part of function buttons Bi are displayed at the positions from which the function buttons have been moved.

As described above, the moving instruction input key 381 and the moving instruction input key 382 function, similarly to the slider 340, as operation members which receive the scroll instruction input for instructing the scroll operation.

In addition, the display content of the button display area 310 is changed also by a user's touch operation (in detail, a flick operation and the like) to the button display area 310 itself. Specifically, a left flick operation in the vicinity of the button display area 310 scroll-moves the function buttons Bi to the left, and moves the display object range of the part of function buttons Bi to be displayed in the button display area 310 to the right. To the contrary, a right flick operation in the vicinity of the button display area 310 scroll-moves the function buttons Bi to the right, and moves the display object range of the part of function buttons Bi to be displayed in the button display area 310 to the left. The distance of the movement of the function buttons Bi due to the flick operation is changed according to the speed of the flick operation.

As described above, the scroll display related to the display object buttons in the button display area 310 is realized by the following operations and the like: the operation using the slider 340; the operation using the moving instruction input keys 381 and 382; and the flick operation performed directly on the button display area 310.

Further, in the advanced settings menu screen 300, when any of the function buttons Bi in the button display area 310 is selected as a setting object function button (a button corresponding to a function of a setting object) and is pressed down by the user, the MFP 10 displays a detailed settings screen 400 to be used to set details related to the pressed down function button. For example, in the advanced settings menu screen 300 of FIG. 6, when the function button B12 ("Booklet" button) in the button display area 310 is pressed down, the detailed settings screen 400 (FIG. 7) corresponding to the function button B12 is pop-up displayed.

Figure 7:
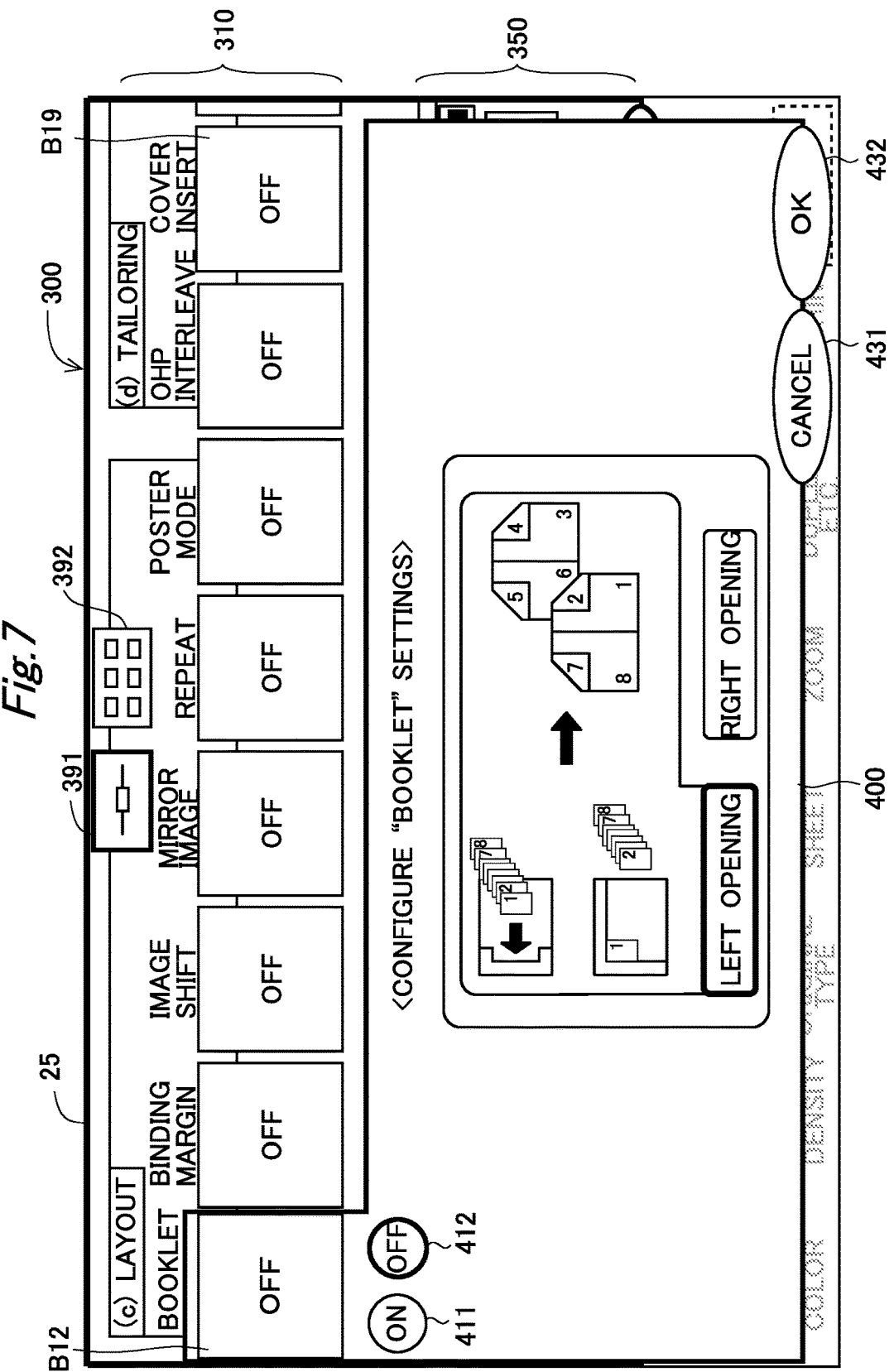
FIGS. 7, 8, and 9 are diagrams each showing a detailed settings screen in the one-line display mode.

FIG. 7 is a diagram showing the state immediately after the function button B12 is pressed down. The detailed settings screen 400 in FIG. 7 is a screen to be used to set details related to the function "Booklet" corresponding to the function button B12. This detailed settings screen 400 is provided with an "ON" button 411 to switch the function "Booklet" to "on" and an "OFF" button 412 to switch the same function "Booklet" to "off." In addition, the detailed settings screen 400 is also provided with a setting item to set which to use "Left Opening" or "Right Opening", and other setting items.

As shown in FIG. 7, the detailed settings screen 400 is displayed mostly below the setting object function button so as not to hide the setting object function button (B12, here) disposed on the upper side. Further, in order to indicate that the detailed settings screen 400 and the setting object function button relate to each other, the detailed settings screen 400 has a shape of a speech balloon coming from the setting object function button. More specifically, the detailed settings screen 400 has a shape in which a relatively small rectangle (approximate square) and a relatively large rectangle (laterally long rectangle) are connected at a part of the upper side of the laterally long rectangle (such a shape will also be referred to as an "L-shape").

The section of the laterally long rectangle is a section of a figure in which there are disposed various setting items and the like related to the functions (for example, "Booklet") corresponding to the setting object function buttons (such a figure will also be referred to as a "figure for setting items to be arranged in"). The section of the rectangle is disposed below the setting object function button (the button display area 310) so that the setting object function button does not overlap the setting object function button.

In addition, the section of the approximate square is expressed as a "section (projecting section) projecting upward from the laterally long rectangle," and is a figure indicating the position of the starting point (showing up position) from which the shape of the speech balloon comes (such a figure will also be referred to as a "figure of the starting point of the speech balloon"). The section of the approximate square has approximately the same size as the setting object function button but is a slightly larger than the setting object function button, and the setting object function button is disposed to be superimposed on the section of the approximate square. In other words, the projecting section (approximate square section) of the detailed settings screen 400 is disposed to be in contact with (and to surround) the setting object function button. Note that the projection amount of the projecting section from the laterally long rectangle (the figure for setting items to be arranged in) may be reduced, and the projecting section may be disposed close to but not in contact with the setting object function button. This arrangement also can indicate the relationship between the projecting section and the setting object function button.

As described above, the detailed settings screen 400 corresponding to the setting object function button has a figure section (rectangular projecting section) indicating the relationship to the setting object function button and is disposed without hiding the setting object function button.

Figure 8:
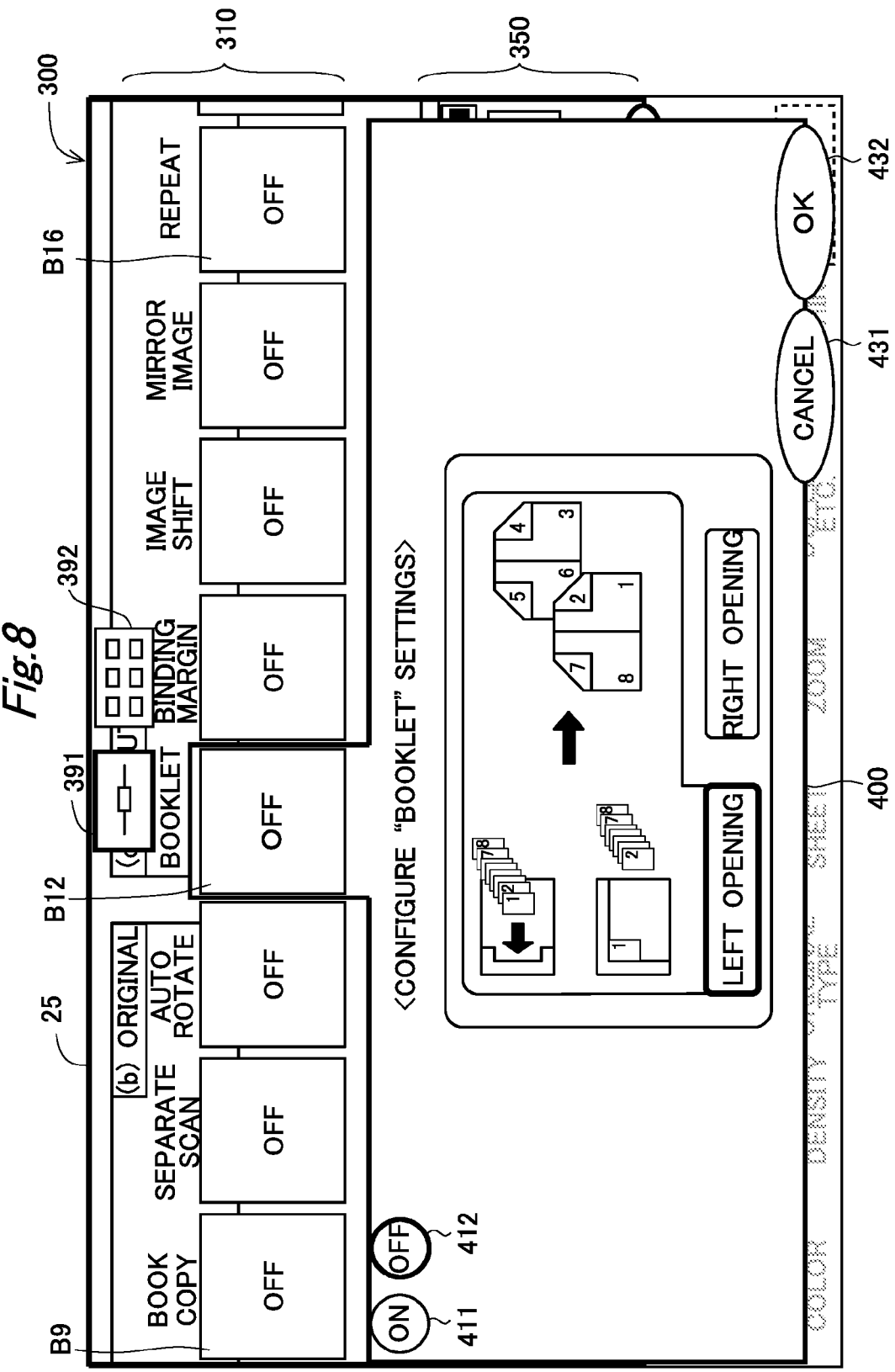
Figure 9:
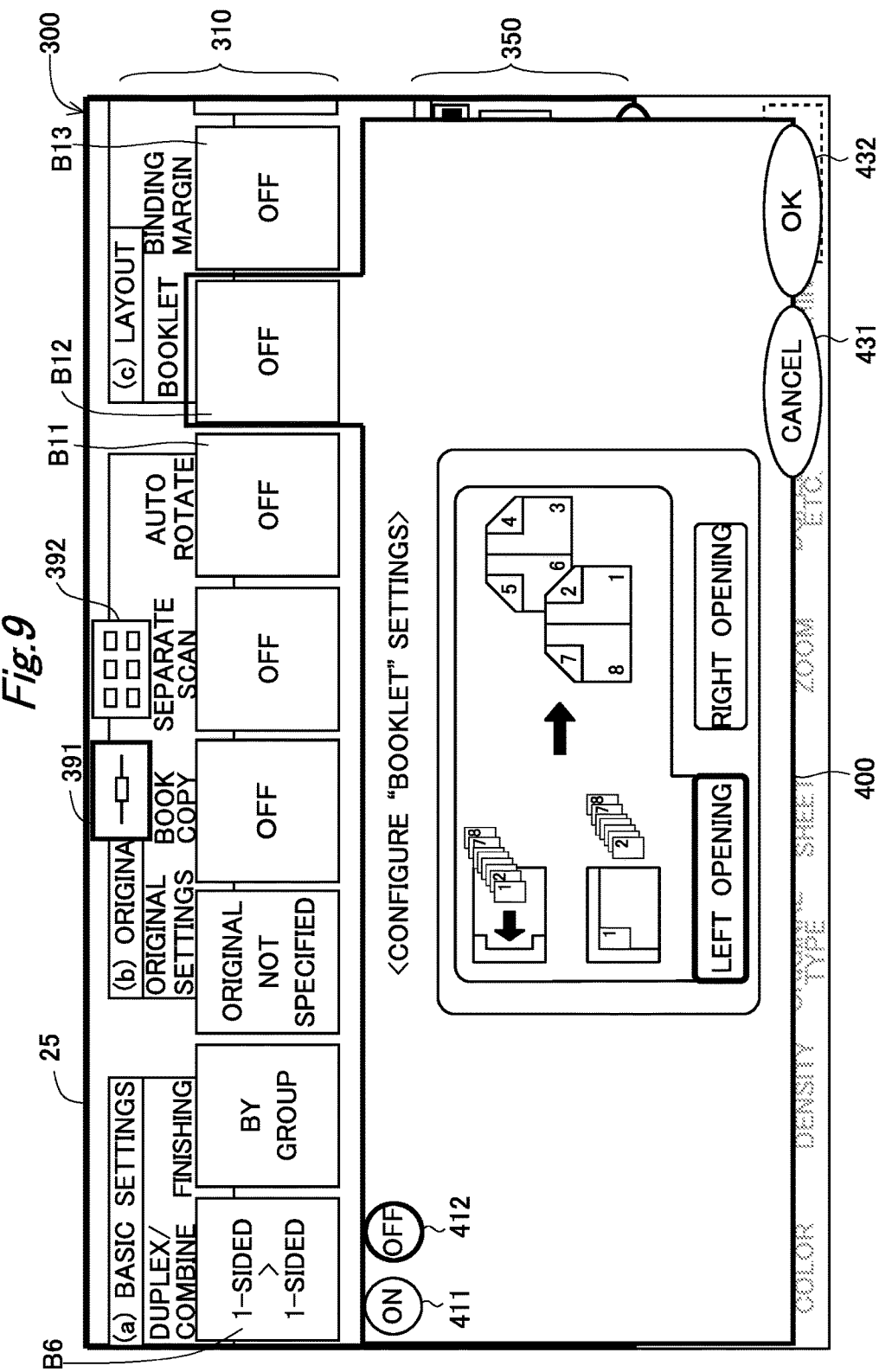

Note that FIG. 7 shows the detailed settings screen 400 to be displayed when the function button B12 at the left end in the screen is pressed down. However, the function button B12 can be at different positions, depending on the state of the scroll (see FIG. 8, FIG. 9, and the like). FIG. 8 and FIG. 9 each show the detailed settings screen 400 to be displayed in response to the pressing down of the function button B12 after the function button B12 has been moved to another position according to a scroll operation. In detail, FIG. 8 shows the detailed settings screen 400 to be displayed in response to the pressing down of function button B12 located approximately at the center after the function button B12 has been moved, according to a scroll operation, approximately to the center in the horizontal direction. FIG. 9 shows the detailed settings screen 400 to be displayed in response to the pressing down of the function button B12 after the function button B12 has been further moved to the right according to a scroll operation. As shown in FIG. 7 to FIG. 9, the projecting section for indicating the relationship to the function button Bi is displayed at the position corresponding to the position at which the pressed down function button Bi is located.

Further, when a setting operation (a press-down operation on the "ON" button 411) is performed in FIG. 7 to instruct to set the "Booklet" function to "on," the "Booklet" function is changed from "OFF" to "ON."

After that, if a cancel button 431 in the detailed settings screen 400 is pressed down for some reason, the change of the setting content using the detailed settings screen 400 is cancelled, and the detailed setting operation is interrupted. Then, the detailed settings screen 400 is placed in a non-displayed state, and the advanced settings menu screen 300 (FIG. 6) is displayed on the forefront.

Figure 10:
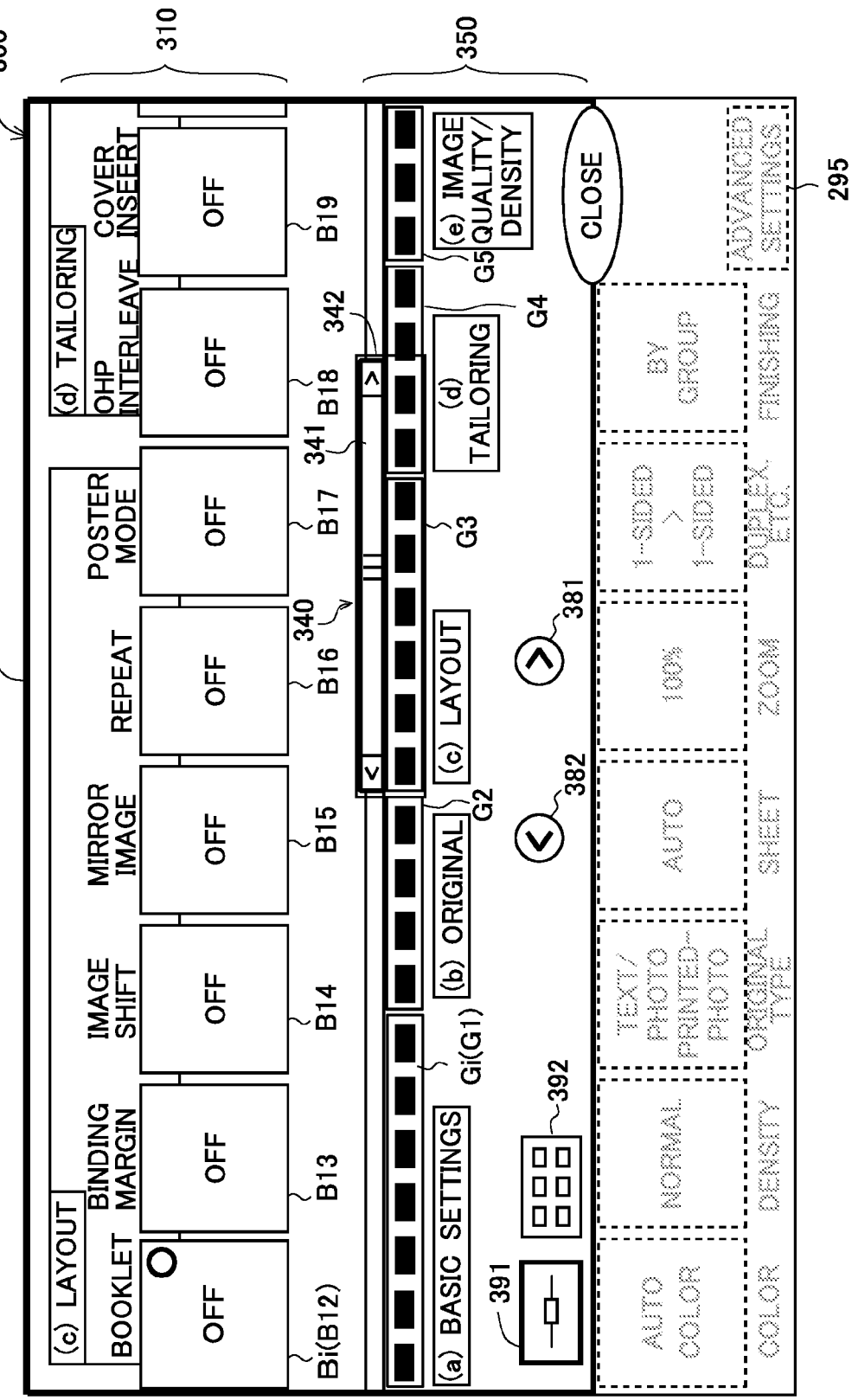
FIGS. 10 and 11 are diagrams each showing the advanced settings menu screen after a setting operation using the detailed settings screen.

On the other hand, when the OK button 432 in the detailed settings screen 400 of FIG. 7 is pressed down, the content of the change, in the setting, made by using the detailed settings screen 400 is reflected to the actual setting, and the detailed setting operation is completed. Then, the detailed settings screen 400 is placed in a non-displayed state, and the advanced settings menu screen 300 (FIG. 10) is displayed on the forefront.

However, in the advanced settings menu screen 300 (FIG. 10) after the detailed setting operation has been completed, a "mark" ("circle," here) is used to indicate that the settings have been changed with respect to the "Booklet" function or the like. Specifically, when a setting operation is performed by using the detailed settings screen 400 corresponding to the function button (also referred to as the "setting object function button") Bi which is determined (selected), in the advanced settings menu screen 300, as a setting object, the "marks" are attached to the function buttons corresponding to all the functions whose settings have been changed in association with the setting operation.

In more detail, when the setting operation is performed to set the "Booklet" function to "on," the settings of the four functions are changed in association with the setting operation. Specifically, the setting content related to the function item "Booklet" itself is first changed from "OFF" to "ON." Further, in response to the setting operation (interlocking with the setting operation), the settings of the three functions are automatically changed. In detail, the setting content of the function item "Zoom" (magnification change function) is changed from "100%" to "70.7%," the setting content related to the function item "Simplex/Duplex" (print side setting function (duplex print output function)) is changed from "Simplex" to "Duplex," the setting content related to the function item "Finishing" (finishing change function) is changed from "By Group" to "By Copy Set." Then, the marks (circles, here) indicating that the settings have been changed are attached on the upper right in all the function buttons (four function buttons B12, B5, B6, and B7, here) corresponding to the functions ("Booklet," "Zoom," "Duplex/Combine," and "Finishing") whose settings have been changed.

Figure 11:
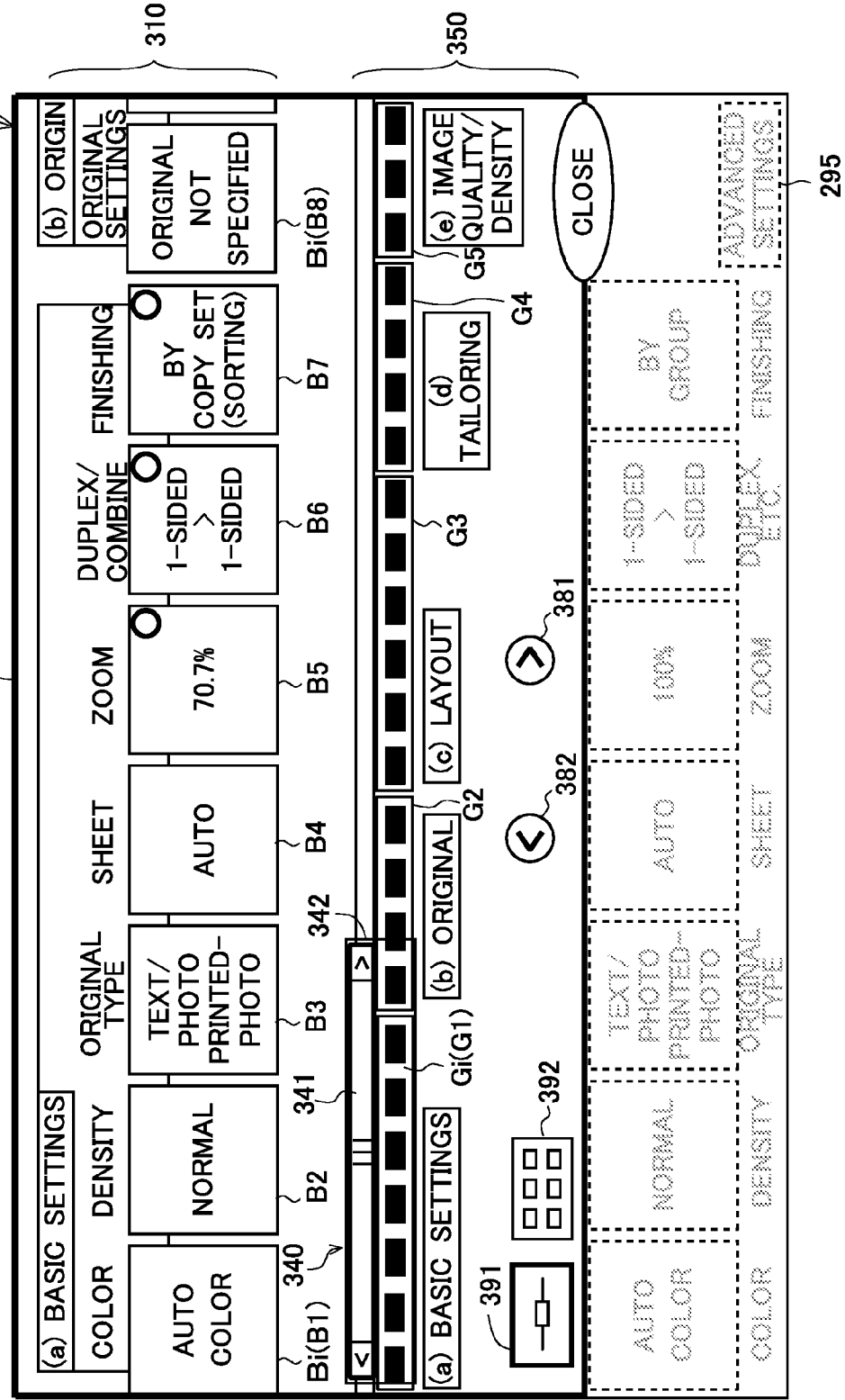

With this arrangement, it can be relatively easy to visually confirm the functions whose settings have been changed in association with the setting operation of the "Booklet" function. In more detail, in the advanced settings menu screen 300 of FIG. 10, it is possible to visually confirm first the mark attached on the upper right part of the "Booklet" function button B12. In addition, a scroll operation is performed to display the advanced settings menu screen 300 as shown in FIG. 11 so that it is possible to visually confirm the marks each attached on the upper right part of each of the "Zoom" function button B5, the "Duplex/Combine" function button B6, and the "Finishing" function button B7.

Further, in the advanced settings menu screen 300, there is provided mode switching buttons 391 and 392 (switching operation means) for switching the display mode of the setting screen between the two display modes M1 and M2. The mode switching button 391 is a button for switching to the one-line display mode M1, and the mode switching button 392 is a button for switching to the grid display mode M2.

In this advanced settings menu screen 300 (see FIG. 5 and FIG. 6), the mode switching button (also referred to as a "one-line display mode designation button") 391 of the two is highlighted (bold) (color display or the like is possible) to indicate that the one-line display mode M1 is currently selected. In the advanced settings menu screen 300 (FIG. 5 and the like), when the other mode switching button (also referred to as a "grid display mode designation button") 392 of the two is pressed down, the operation of switching from the one-line display mode M1 to the grid display mode M2 is performed. Immediately after the mode is switched to the grid display mode M2, the advanced settings menu screen 500 (FIG. 12) in the initial state is displayed. Further, also when the mode switching button 392 is pressed down while the detailed settings screen 400 (FIG. 7 and the like) of the one-line display mode M1 is displayed, the advanced settings menu screen 500 (FIG. 12) in the initial state is displayed in a similar manner. In this case, the content being set on the detailed settings screen 400 (FIG. 7) is cancelled, and a transition is made into the grid display mode M2. Note that, as shown in FIG. 7 and the like, when the detailed settings screen 400 is being displayed, the mode switching buttons 391 and 392 are (moved to and) displayed on the upper side in the advanced settings menu screen 300 so that the mode switching buttons 391 and 392 are not displayed on the detailed settings screen 400.

<1-4. Grid Display Mode>

Next, the advanced settings menu screen 500 and the like of the grid display mode M2 will be described.

Figure 12:
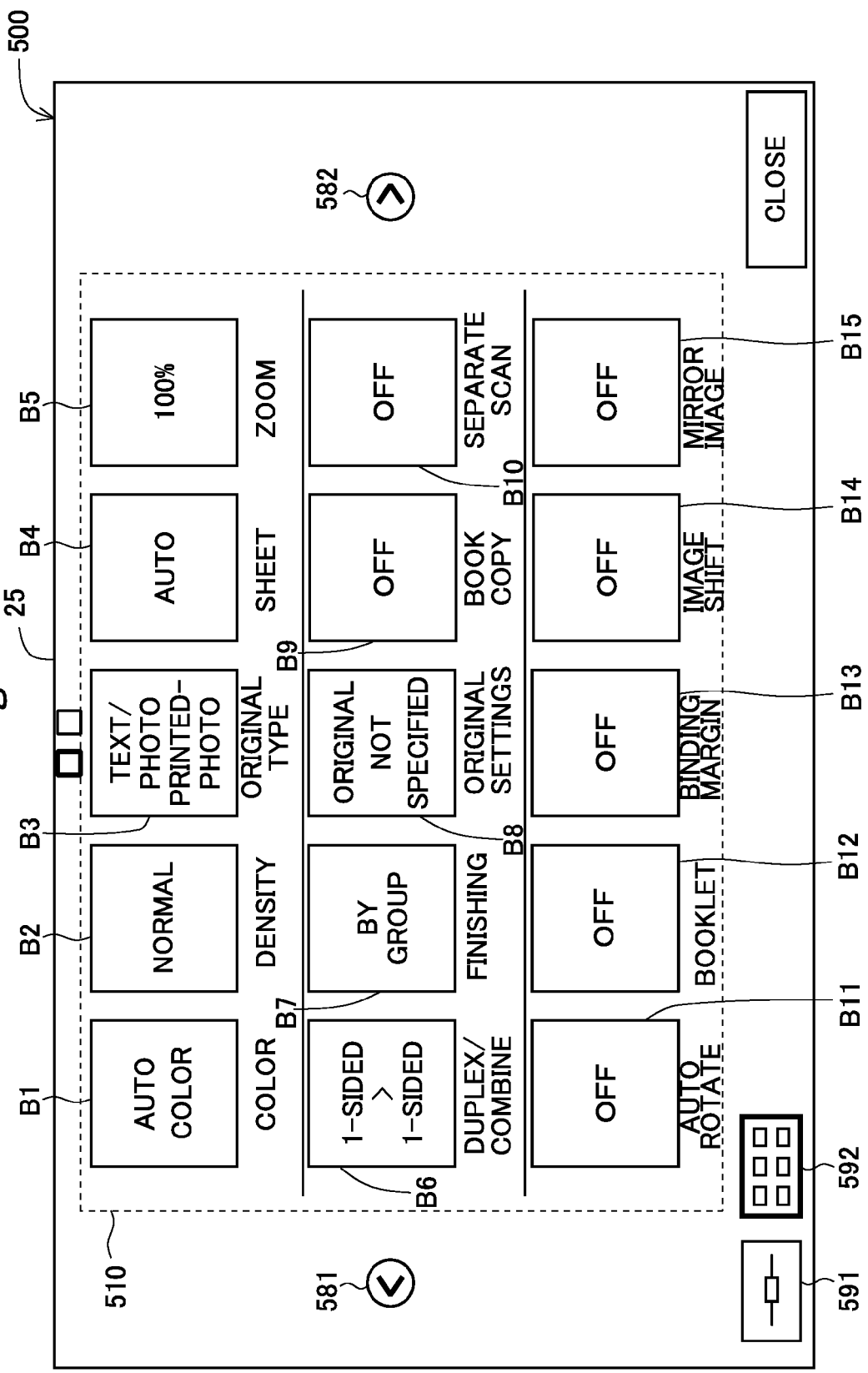
FIG. 12 is a diagram showing an advanced settings menu screen (initial screen) in a grid display mode.

FIG. 12 is a diagram showing the advanced settings menu screen 500 of the grid display mode M2. Also in the advanced settings menu screen 500, the function buttons Bi are displayed as in the advanced settings menu screen 300 of the one-line display mode M1. However, the number of function buttons Bi concurrently displayed, the arrangement of the function buttons Bi, and the like are different from those in the advanced settings menu screen 300 of the one-line display mode M1.

Figure 13:
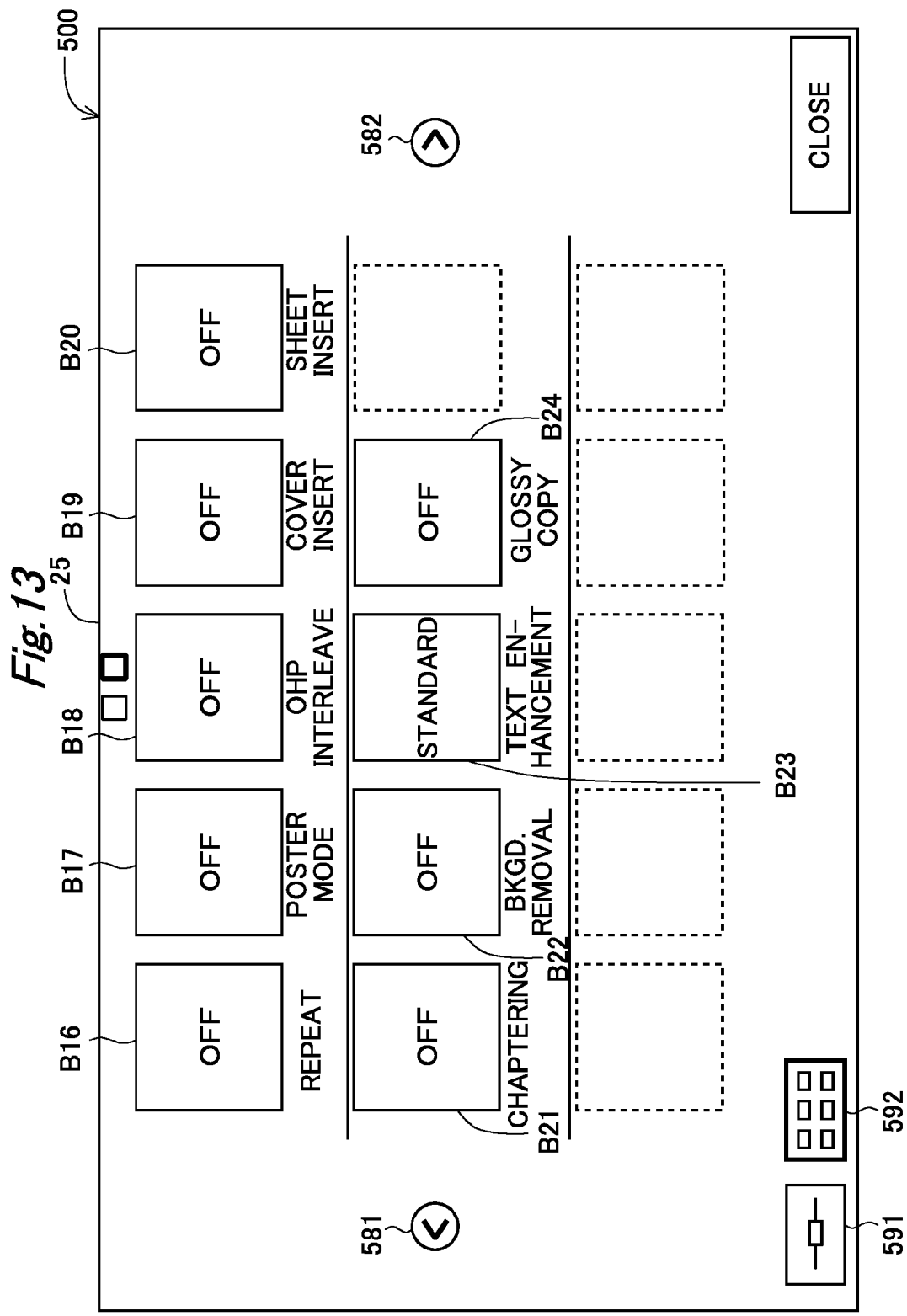
FIG. 13 is a diagram showing the advanced settings menu screen in the grid display mode after a page is changed.

As shown in FIG. 12, the advanced settings menu screen 500 has a button display area 510 in which at least a part of function buttons of the plurality of function buttons Bi are displayed in a grid-like manner. In other words, in the button display area 510, at least the part of function buttons are disposed to be arranged in two different directions (the lateral direction and the vertical direction). In this embodiment, in the button display area 510, total 15 function buttons Bi can be displayed to be arranged in five columns in the lateral direction and three rows in the vertical direction. That is, fifteen function buttons Bi can be concurrently displayed at the maximum. In other words, the maximum arrangement number of the function buttons Bi on the advanced settings menu screen 500 is 15. In the advanced settings menu screen 500, if the total number (for example, 24) of the function buttons Bi is greater than a maximum arrangement number (for example, 15), the plurality of function buttons Bi are displayed to be distributed into a plurality of pages. Here, the number 24 of the function buttons Bi is greater than the maximum arrangement number 15, 24 function buttons Bi are displayed to be distributed into two pages (see FIG. 12 and FIG. 13).

Specifically, on the first page (see FIG. 12), the five function buttons B1 to B5 out of the seven function buttons related to the "Basic Settings" group G1 are arranged on the top row in the button display area 510. On the middle row in the button display area 510, the other two function buttons B6 and B7 related to the "Basic Settings" group G1 and the three function buttons B8 to B10 out of the five function buttons related to the "Original" group G2 are arranged. In the bottom row in the button display area 510, the remaining one function button B11 related to the "Original" group G2 and the four function buttons B12 to B15 out of the six function buttons related to the "Layout" group G3 are displayed.

On the second page (see FIG. 13), the remaining two buttons B16 and B17 related to the "Layout" group G3 and the three function buttons B18 to B20 out of the four function buttons related to the "Tailoring" group G4 are arranged on the top row in the button display area 510. On the middle row in the button display area 510, the remaining one function button B21 related to the "Tailoring" group G4 and the three function buttons B22 to B24 related to the "Image Quality/Density" group G5 are displayed. In this embodiment, the rightmost position on the middle row and all the positions on the bottom row in the button display area 510 on the second page are "vacant" positions, at which no function buttons are arranged.

Movement between the pages is performed in response to a press-down operation (previous page instruction operation) of a page change button 581 and a press-down operation (next page instruction operation) of a page change button 582. In detail, when the page change button 582 on the right side is pressed down while the first page (FIG. 12) of the advanced settings menu screen 500 is displayed, the second page (FIG. 13) of the advanced settings menu screen 500 is displayed. To the contrary, when the page change button 581 on the left side is pressed down while the second page of the advanced settings menu screen 500 is displayed, the first page of the advanced settings menu screen 500 is displayed.

Alternatively, the operation of the movement between pages is also performed in response to a flick operation performed directly on the button display area 510. Note that, in the grid display mode M2, the display object function buttons can be changed only by a unit of page.

In this arrangement, in the grid display mode M2, the function buttons disposed in each of the plurality of pages are always displayed at the same positions (fixed positions) on each page. In other words, each function button is disposed at its own position (unique position). Therefore, if the user remembers the position (for example, the second position from the left side on the bottom row on the first page) of the "Booklet" button, it is relatively easy to find out the intended button.

Further, the size of each function button Bi in the grid display mode M2 is the same as the size of each function button Bi in the one-line display mode M1. With this arrangement, even when switching is made between the one-line display mode M1 and the grid display mode M2, the user can have a uniform operation feeling in the both modes M1 and M2.

In addition, when the user selects and presses down, in the advanced settings menu screen 500, any of the function buttons Bi in the button display area 510 as the setting object function button, the MFP 10 displays a detailed settings screen 600 corresponding to the pressed down function button (setting object function button). For example, in the advanced settings menu screen 500 of FIG. 12, when the function button B12 ("Booklet" button) in the button display area 510 is pressed down, the MFP 10 displays the detailed settings screen 600 (FIG. 14) for setting details related to the function button B12.

Figure 14:
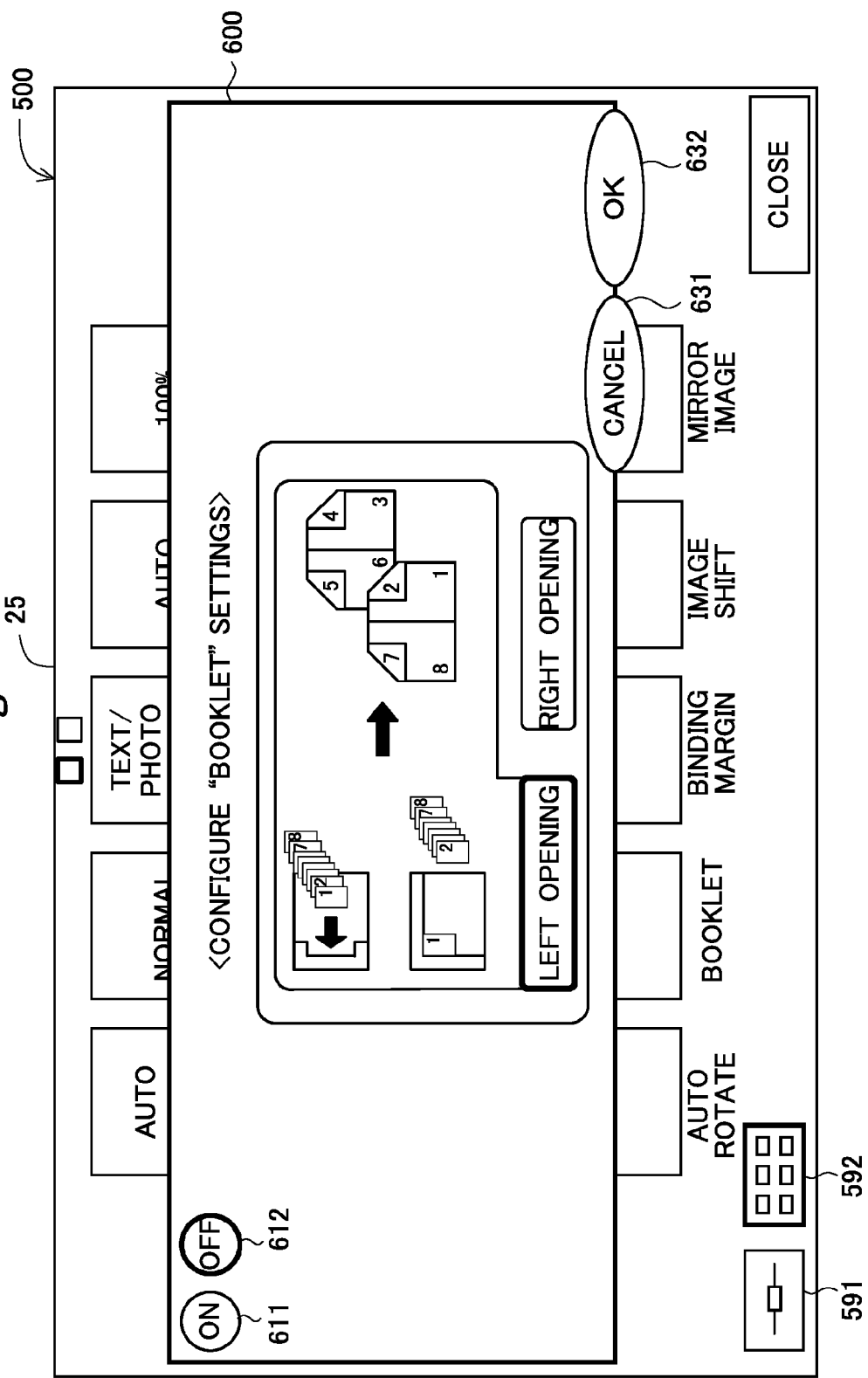
FIG. 14 is a diagram showing a detailed settings screen in the grid display mode.

FIG. 14 is a diagram showing the detailed settings screen 600 which is pop-up displayed immediately after the function button B12 is pressed down. This detailed settings screen 600 is a screen for setting details related to the function "Booklet" corresponding to the function button B12. The detailed settings screen 600 of the grid display mode M2 has the same content as the detailed settings screen 400 of the one-line display mode M1. Specifically, the detailed settings screen 600 is provided with an "ON" button 611 for switching the function "Booklet" to "on" and with an "OFF" button 612 for switching the function "Booklet" to "off." The detailed settings screen 600 is also equipped with a setting item and the like for setting which to use "Left Opening" or "Right Opening," similarly to the detailed settings screen 400.

As shown in FIG. 14, the detailed settings screen 600 of the grid display mode M2 is displayed at a predetermined position (approximately the center in both the up-and-down direction (vertical direction) and the right-and-left direction (lateral direction), here). This detailed settings screen 600 is always displayed at the same position (common position) independently of the setting object function button. In other words, the detailed settings screen 600 is displayed at a fixed position (common predetermined position) which does not depend on which button is selected as the setting object function button. As described above, independently of which function button Bi is selected as the setting object function button, each detailed settings screen 600 of the grid display mode M2 is always displayed at the predetermined position (common position) on the touch screen 25. Therefore, a uniform operation feeling can be provided to the user in the plurality of different detailed settings screens 600 displayed in response to the pressing down of the function buttons Bi. In other words, since any of the plurality of detailed settings screens 600 is displayed at the predetermined position (common position), there can be uniformity (consistency) between the detailed settings screens of the plurality of functions.

Note that, in the grid display mode M2, there is no specific display (the word balloon shaped display in FIG. 7) (also referred to as a "related display") which indicates the relationship between the detailed settings screen 600 and the setting object function button. In the grid display mode M2, each function button Bi is always displayed at the same position (a position (fixed position) which is unique to each function button) on each page, and there occurs no such state as in the one-line display mode M1, in other words, such state in which the function button B12 moves to different positions, depending on the state of scrolling. As a result, the user does not frequently press the wrong function button Bi and thus can relatively easily memorize the positions (particularly, the positions of the frequently used function buttons Bi) of the function buttons Bi. Therefore, it can be thought that it is less necessary to display the relationship between the function buttons Bi and the detailed settings screens 600, and in this embodiment, there is no specific display to indicate the relationship between the detailed settings screens 600 and the setting object function buttons.

Further, when a setting operation (a press-down operation on the "ON" button 611) is performed in FIG. 14 to instruct to set the "Booklet" function to "on," the setting of the "Booklet" function is changed from "OFF" to "ON."

After that, if a cancel button 631 in the detailed settings screen 600 is pressed down for some reason, the change of the setting content by using the detailed settings screen 600 is cancelled, and the detailed setting operation is interrupted. Then, the detailed settings screen 600 is placed in a non-displayed state, and the advanced settings menu screen 500 (FIG. 12) is displayed on the forefront.

On the other hand, when an OK button 632 in the detailed settings screen 400 of FIG. 14 is pressed down, the content of the change, in the setting, made by using the detailed settings screen 600 is reflected to the actual setting, and the detailed setting operation is completed. Then the detailed settings screen 600 is placed in a non-displayed state, and the advanced settings menu screen 500 (FIG. 15) is displayed on the forefront.

Figure 15:
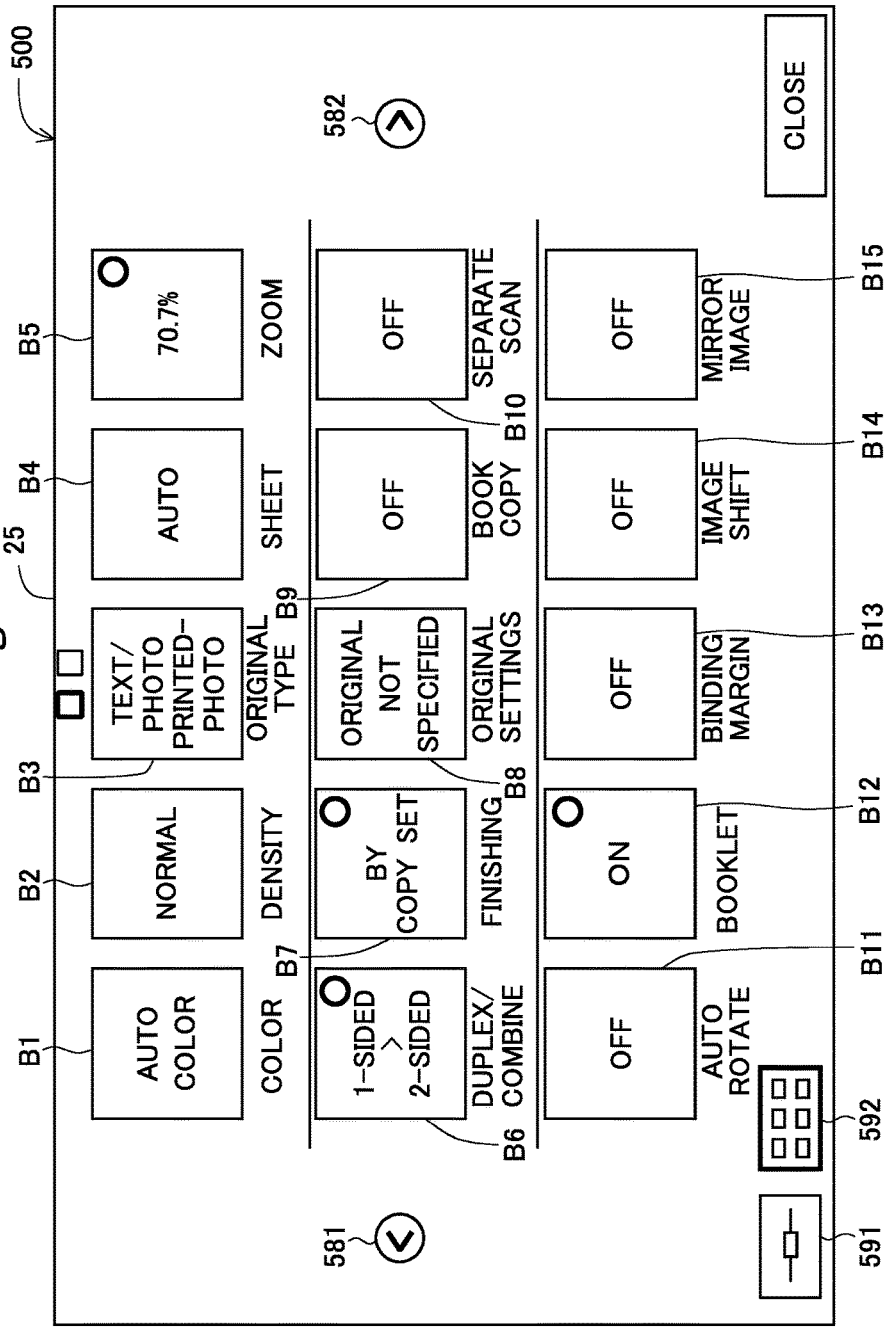
FIG. 15 is a diagram showing the advanced settings menu screen after a setting operation using the detailed settings screen.

However, in the advanced settings menu screen 500 (FIG. 15) to which the control has returned, the "mark" is used to indicate that the settings have been changed with respect to the "Booklet" function or the like. Specifically, when a setting operation is performed using the detailed settings screen corresponding to the function button (also referred to as the "setting object function button") Bi which is selected, in the advanced settings menu screen 500, as a setting object, the "mark" is attached to the function buttons corresponding to all the functions whose settings have been changed in association with the setting operation. With reference to FIG. 15, the "mark" (circle, here) is attached to the upper right part of each of all the function buttons B12, B5, B6, and B7 corresponding to the functions ("Booklet," "Zoom," "Duplex/Combine," and "Finishing") whose settings have been changed.

This arrangement can make it relatively easy to visually confirm the functions whose settings have been changed in association with the setting operation of the "Booklet" function. In particular, all the four function buttons B12, B5, B6, and B7 corresponding to all the functions whose settings have been changed are displayed in the single advanced settings menu screen 500, and the marks are attached to the function buttons B12, B5, B6, and B7. Therefore, the user only has to move his or her eyes to see, without a scroll operation, all the four function buttons to which the marks are attached.

In addition, the advanced settings menu screen 500 is provided with mode switching buttons 591 and 592 (buttons for receiving a mode switching instruction) for switching the display mode of the setting screen between the two display modes M1 and M2. The mode switching button 591 is a button for switching to the one-line display mode M1, and the mode switching button 592 is a button for switching to the grid display mode M2. The mode switching button 591 has the same shape and size as the mode switching button 391, and the mode switching button 592 has the same shape and size as the mode switching button 392.

In this advanced settings menu screen 500 (see also FIG. 12 and FIG. 13), the mode switching button 592 is highlighted (bold) (color display or the like is possible) to indicate that the grid display mode M2 is currently selected. In the advanced settings menu screen 500 (FIG. 12 and the like), when the other mode switching button 591 is pressed down, a switching operation from the grid display mode M2 to the one-line display mode M1 is performed. Immediately after the mode is switched to the one-line display mode M1, the advanced settings menu screen 300 (FIG. 5) in the initial state is displayed. Also when the mode switching button 591 is pressed down while the detailed settings screen 600 (FIG. 14) of the grid display mode M2 is being displayed, the advanced settings menu screen 300 (FIG. 5) in the initial state is displayed in a similar manner. In this case, the content being set on the detailed settings screen 600 (FIG. 14) is cancelled, and a transition is made to the one-line display mode M1.

As described above, the two types of the advanced settings menu screens 300 and 500 are switched to each other to be displayed by using the mode switching buttons 392 and 591.

In the above aspect, the two display modes M1 and M2 having different characteristics are switched to each other by using the mode switching buttons 392 and 591. In detail, the MFP 10 performs the display mode switching process in response to the press-down operation corresponding to the mode switching button (392, 591) displayed in the currently displayed menu screen of the two menu screens of the advanced settings menu screen 300 of the one-line display mode M1 and the advanced settings menu screen 500 of the grid display mode M2.

In this arrangement, in the one-line display mode M1, as described above, the user can obtain an advantage that, when finding out an intended function button from a plurality of function buttons in a button display area 310 in which a predetermined number of function buttons are arranged in a row in a predetermined direction, the user only has to move his or her eyes in a predetermined direction (one direction). However, there is a drawback, in the one-line display mode M1, that the user may overlook the intended button since many function buttons are displayed while being scrolled and the position of the intended button is occasionally moved on the screen. In addition, there is also a drawback that the visibility at a glance is poor since it is difficult to increase the number of the function buttons to be able to be displayed in the screen to a number which is not less than a certain number, for example, 10.

On the other hand, in the grid display mode M2, relatively many (for example, 24) function buttons can be concurrently displayed in the screen in the grid-like (two-dimensional) arrangement; therefore, relatively high visibility at a glance can be obtained. In addition, the many function buttons are each displayed at the same position (unique position) in the grid-like display technique; therefore, if the user remembers the position of the intended function button, it is possible to access relatively quickly the intended function button. However, the grid-like display technique has a drawback that, when finding out the intended button in the menu screen, the user has to track the intended button with eyes in the two directions of the lateral direction and the vertical direction and it is therefore not easy to track with eyes.

In the above embodiment, the user can switch the two types of display modes M1 and M2 as described above to each other by using the mode switching buttons 392 and 591. Thus, the user can appropriately select, depending on his or her way of usage or preference (taste), a preferable display mode from the two types of display modes M1 and M2, and the operability of the user can thus be improved.

2. Second Embodiment

A second embodiment is a modified example of the first embodiment. In the following, a description will be made mainly on the difference from the first embodiment.

In the above first embodiment, there has been exemplified the aspect in which the display mode switching process is performed in response to a manual operation (in detail, the press-down operation of the mode switching button).

In the second embodiment, an aspect will be exemplified in which a display mode switching process will be automatically performed when a predetermined condition is satisfied.

Figure 16:
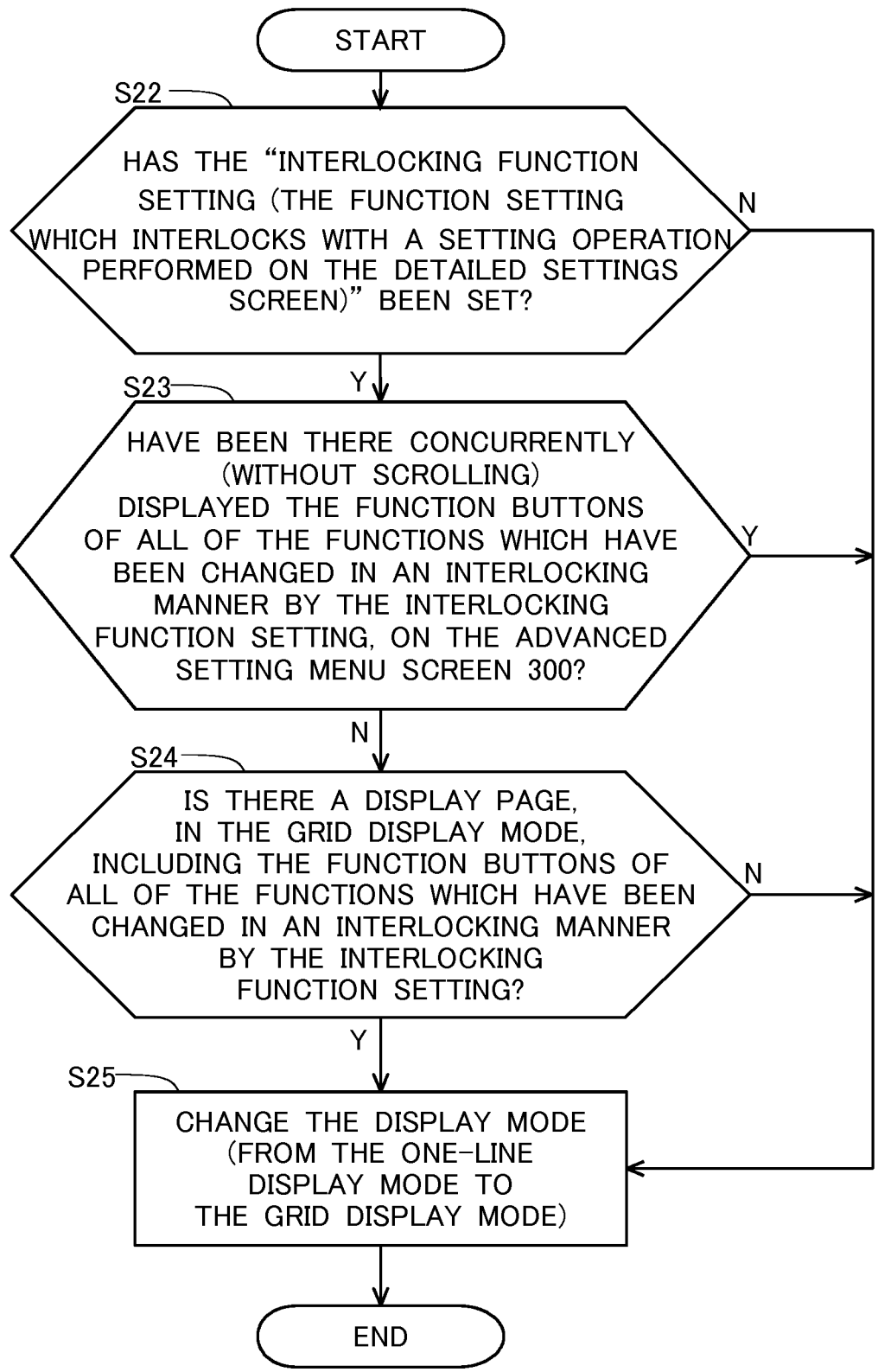
FIG. 16 is a flowchart showing an operation according to a second embodiment.

FIG. 16 is a flowchart showing an operation according to the second embodiment. The operation according to this flowchart is performed by the MFP 10 immediately after the setting operation using the detailed settings screen 400 is finished. For example, the operation is performed after the setting object function button is selected on the advanced settings menu screen 300 (FIG. 6) of the one-line display mode M1 and after the setting operation is performed using the detailed settings screen 400 (FIG. 7) corresponding to the setting object function button. In more detail, the flowchart of FIG. 16 is executed immediately after the setting operation is performed using the detailed settings screen 400 (see FIG. 7) of the one-line display mode M1 and the OK button 432 (see FIG. 7) is then pressed down.

Specifically, first, in step S22, it is determined whether or not the setting process using the detailed settings screen is "independent function setting" or "interlocking function setting". Here, the "independent function setting" is a setting process in which the setting content is changed only with respect to that function (with a single function), depending on the setting operation using the detailed settings screen related to some function. On the other hand, the "interlocking function setting" is a setting process in which the setting content is changed only with respect to that function, depending on the setting operation using the detailed settings screen related to some function, and in which the setting content related to a function other than that function is also automatically changed in an interlocking manner.

For example, as described above, when the setting related to the function "Booklet" is changed from "OFF" to "ON," the settings related to the three other functions ("Zoom," "Duplex/Combine," and "Finishing") are also (automatically) changed in an interlocking manner. Therefore, the setting related to the function "Booklet" is determined as the "interlocking function setting." However, when the setting related to the function "Density" is changed, only the setting related to the function "Density" is changed; therefore, the setting related to the function "Density" is the "independent function setting."

In step S22, if the setting process using the detailed settings screen is determined as the "independent function setting," the process of FIG. 16 is finished without changing the display mode. For example, if the setting process related to the function "Density" is performed, the setting process is determined as the independent function setting, and the advanced settings menu screen 300 is displayed while the one-line display mode M1 is maintained.

On the other hand, the setting process using the detailed settings screen is determined as the "interlocking function setting" in step S22, the process proceeds to step S23.

In step S23, it is determined whether or not the two or more function buttons corresponding to the two or more functions (including the function whose setting has been automatically changed in response to the setting operation) whose settings have been changed in association with the setting operation (the setting operation related to the "interlocking function setting") have been concurrently displayed in the immediately preceding advanced settings menu screen 300.

If the two or more function buttons have been concurrently displayed in the advanced settings menu screen 300, the process of FIG. 16 is finished, and the advanced settings menu screen 300 is displayed while the one-line display mode M1 is maintained.

Figure 17:
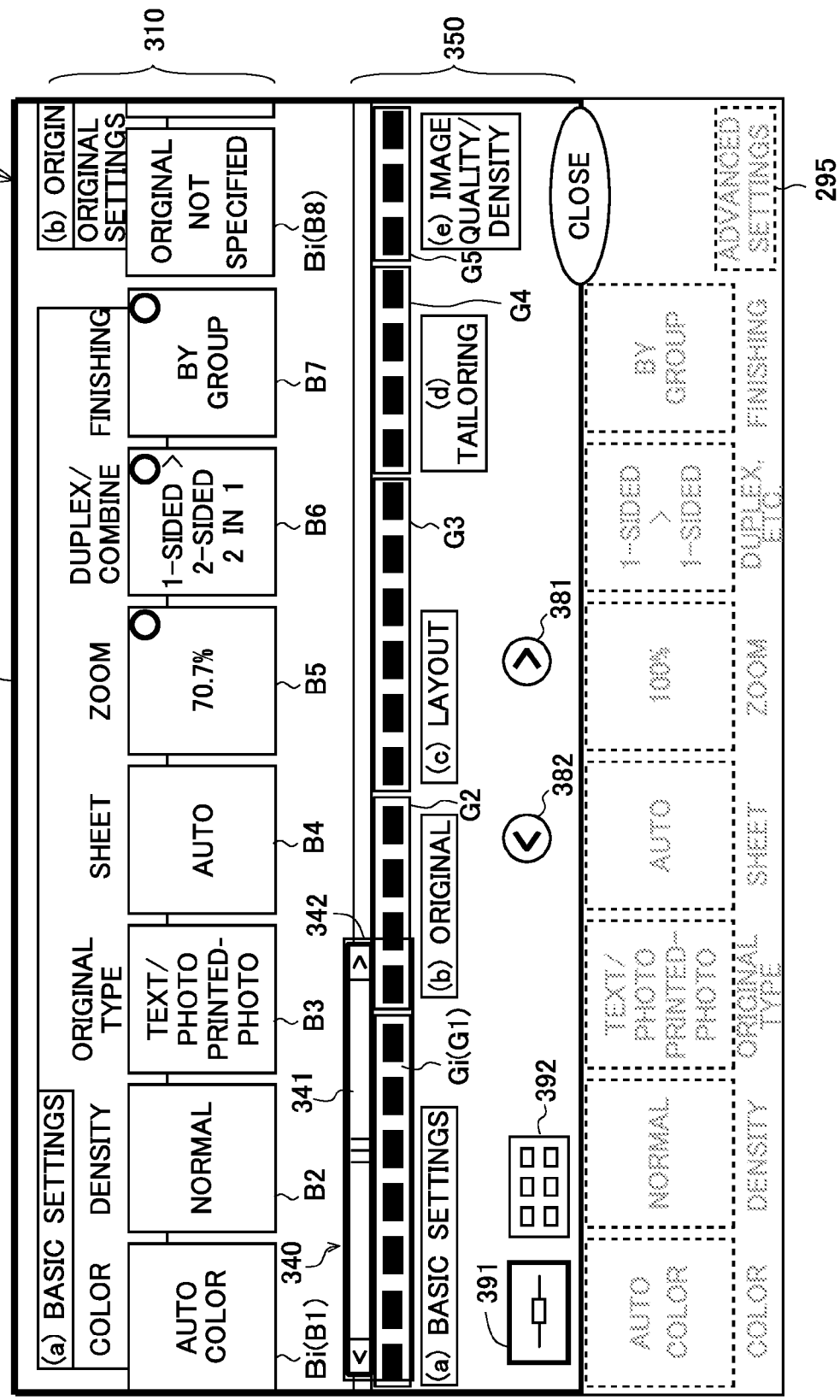
FIG. 17 is a diagram showing the advanced settings menu screen after another setting operation.

For example, if it is supposed that, in the detailed settings screen 400 (not shown) displayed in response to the function button B6 in the advanced settings menu screen 300 not in FIG. 6 but in FIG. 5, the setting operation (the setting operation related to the "interlocking function setting") from "OFF" to "2 in 1" is performed with respect to a function "Combine," the settings of two or more functions (three functions, here) are changed in association with the setting operation. Specifically, the setting related to the function "Combine" is changed from "OFF" to "2 in 1," and the other two functions ("Zoom" and "Finishing") are (automatically) changed in an interlocking manner. In this case, it is determined that the three function buttons B6, B5, and B7 corresponding to the three functions ("Combine," "Zoom," and "Finishing") have been concurrently displayed in the immediately preceding advanced settings menu screen 300 (FIG. 5). Then, the advanced settings menu screen 300 of the one-line display mode M1 is displayed without switching the display mode to the grid display mode M2 (see FIG. 17). In this case, although the mode is not switched to the grid display mode M2, the user can visually confirm, in this advanced settings menu screen 300 (FIG. 17), simultaneously the three function buttons B5, B6, and B7 corresponding to the three functions whose settings have been changed.

On the other hand, if it is determined that the two or more function buttons have not been concurrently displayed in the advanced settings menu screen 300, the process proceeds from step S23 to step S24.

For example, if the setting operation (the setting operation related to the "interlocking function setting") from "OFF" to "ON" is performed with respect to the function "Booklet," the settings of the two or more functions (here, four functions (including the three function whose settings have been automatically changed in response to the setting operation)) are changed in association with the setting operation. In this case, it is determined that the four function buttons B5, B6, B7, and B12 corresponding to the four functions have not been concurrently displayed in the immediately preceding advanced settings menu screen 300 (FIG. 6). Then the process proceeds to step S24.

In step S24, it is further determined whether or not there is a page (also referred to a "page screen") including all of the two or more function buttons, in the advanced settings menu screen 500 of the grid display mode M2.

If there is not a page screen including all of the two or more function buttons, the process of FIG. 16 is finished without changing the display mode, and the advanced settings menu screen 300 is displayed while the one-line display mode M1 is maintained.

On the other hand, in step S24, if there is a page screen including all of the two or more function buttons, the process proceeds to step S25. In step S25, there is performed a process to switch the display mode from the one-line display mode M1 to the grid display mode M2. Specifically, the advanced settings menu screen 500 (in detail, the page screen of the first page of the advanced settings menu screen 500) of the grid display mode M2 is displayed to replace the advanced settings menu screen 300 of the one-line display mode M1.

For example, if the above four function buttons B5, B6, B7, and B12 are not concurrently displayed in the immediately preceding advanced settings menu screen 300 (FIG. 6) and if there is a page screen 500 including all the four function buttons, the page screen 500 as shown in FIG. 15 is displayed to replace the advanced settings menu screen 300. In FIG. 15, the advanced settings menu screen 500 (in detail, the page screen of the first page of the advanced settings menu screen 500) of the grid display mode M2 is displayed.

In addition, as shown in FIG. 15, on the advanced settings menu screen 500 after switching, the "mark" indicating that the setting has been changed is attached to all of the two or more function buttons (for example, the four function buttons B5, B6, B7, and B12) whose settings have been changed.

As described above, when the setting operation (the setting operation related to the "interlocking function setting") from "OFF" to "ON" have been performed with respect to the function "Booklet," the advanced settings menu screen 500 (FIG. 15) including the four function buttons corresponding to the four functions whose settings have been changed in association with the setting operation is automatically displayed to replace the immediately preceding advanced settings menu screen 300 (FIG. 6). The four function buttons B12, B5, B6, and B7 corresponding to the four functions ("Booklet," "Zoom," "Duplex/Combine," and "Finishing") whose settings have been changed are all displayed (briefly speaking, "listed") on the menu screen 500 (FIG. 15) after changing. In more detail, while only a relatively small number of function buttons (specifically, only the function button B12) out of the four function button can be visually confirmed simultaneously in the screen 300 (FIG. 6) before changing, all the four function buttons B12, B5, B6, and B7 can be visually confirmed simultaneously in the screen 500 (FIG. 15) after changing. Therefore, the user can more easily see the state of setting of the four functions. In other words, the user's operability can be improved.

In particular, in the case that the "mark" (a mark image which indicates that the setting has been changed) is attached to the function buttons corresponding to the four functions whose settings have been changed, it is possible to visually confirm, on the advanced settings menu screen 500 (FIG. 15), simultaneously the four function buttons B12, B5, B6, and B7 to which the "marks" are attached. Therefore, it can be easily seen that the settings of the four functions have been changed. In addition, the setting contents ("ON," "70.7%," "Simplex to Duplex," "By Copy Set," and the like) after being changed are each superimposed and displayed on each of the function buttons B12, B5, B6, and B7; therefore, the setting contents after being changed can be easily seen themselves as well.

Note that, in the above second embodiment, the switching process of the display mode is performed if it is determined in step S24 that there is a page screen 500 including all of the two or more function buttons related to the functions whose settings have been changed, but the present invention is not limited thereto. For example, also in the case that there is no page screen including all of the two or more function buttons related to the functions whose settings have been changed, the switching process to the grid display mode M2 may be performed. In more detail, it is also possible to newly display the page screen, having at least one function button of the two or more function buttons, of the plurality of page screens (the advanced settings menu screens 500) related to the grid display mode M2. In particular, it is preferable to newly display the page screen which includes any of the two or more function buttons and includes the largest number of the function buttons of the two or more function buttons.

Further, in the above second embodiment, it is determined in step S23 whether or not the two or more function buttons have been concurrently displayed in the advanced settings menu screen 300, but the present invention is not limited thereto.

For example, it is also possible to determine in step S23 whether or not the two or more function buttons can be concurrently displayed in the advanced settings menu screen 300 without scrolling. Then, under the condition that it is determined that the two or more function buttons cannot be concurrently displayed in the advanced settings menu screen 300 without scrolling, the switching process of the display mode (step S25) may be performed. However, if it is determined that the two or more function buttons can be concurrently displayed in the advanced settings menu screen 300 without scrolling, it is preferable that the process (scrolling process) of changing the display object function buttons is automatically performed in the one-line display mode M1. Specifically, a scroll may be performed so that all of the two or more function buttons are included in the display object function buttons of a predetermined number (for example, eight), and the two or more function buttons may be concurrently displayed in the advanced settings menu screen 300 without scrolling.

3. Third Embodiment

A third embodiment is a modified example of the second embodiment. In the following, a description will be made mainly on the difference from the second embodiment.

In the above second embodiment, there has been exemplified the aspect in which the display mode switching process is automatically performed under the condition that the two or more function buttons corresponding to the two or more functions whose settings have been changed in association with the setting operation have not been concurrently displayed in the immediately preceding advanced settings menu screen 300 or other conditions.

In the third embodiment, an aspect will be exemplified in which, if a number N of the functions whose settings have been changed using the advanced settings menu screen 300 of the one-line display mode M1 is greater than a predetermined value (for example, three), a display mode switching process to the grid display mode M2 is automatically performed.

Figure 18:
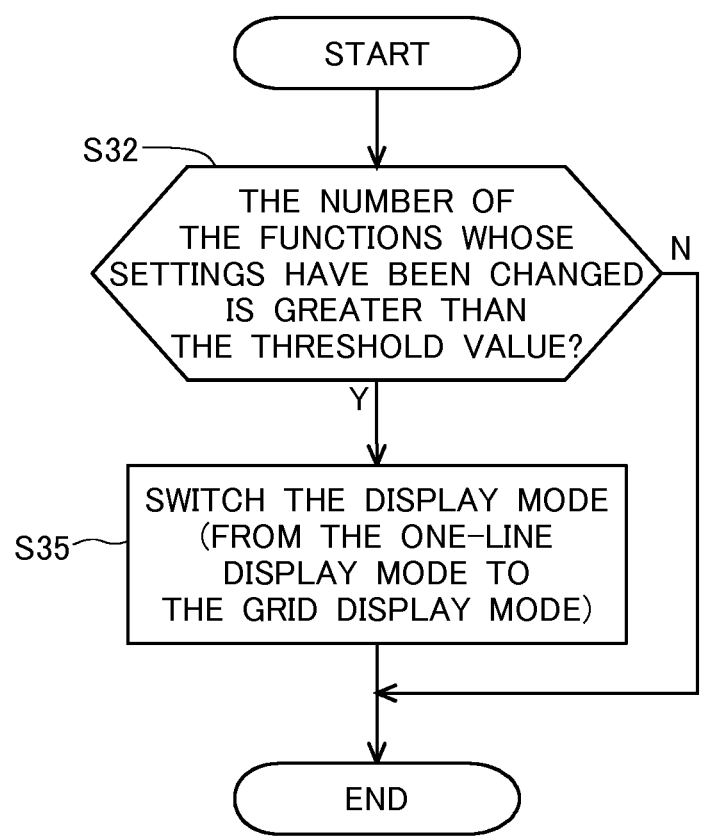
FIG. 18 is a flowchart showing an operation in a third embodiment.

FIG. 18 is a flowchart showing an operation in the third embodiment. The operation according to this flowchart is performed by the MFP 10 immediately after the setting operation using the detailed settings screen 400 is finished. For example, the flowchart of FIG. 18 is executed immediately after the setting operation is performed using the detailed settings screen 400 (see FIG. 7) of the one-line display mode M1 and the OK button 432 is then pressed down.

Specifically, first, in step S32, it is determined whether or not a number (total number) N of the functions whose settings have been changed is greater than a predetermined number (for example, three). For example, if it is determined that only a setting content of one function has been changed by the first one setting operation, the process of FIG. 18 is finished without performing the switching process of the display mode. On the other hand, if it is determined that setting contents of functions totally more than the predetermined number have been changed by the second and following setting operations and the like, the process proceeds from step S32 to step S35. Note that, if the setting contents of the functions (including the functions whose settings have been automatically changed in an interlocking manner) more than the predetermined number have been changed in response to one setting operation, the process also proceeds to step S35.

Then, in step S35, there is performed a process to switch the display mode from the one-line display mode M1 to the grid display mode M2. Specifically, the advanced settings menu screen 500 of the grid display mode M2 is displayed to replace the advanced settings menu screen 300 of the one-line display mode M1. In detail, the page screen including the greatest number of function buttons of the plurality of page screens related to the advanced settings menu screen 500 is automatically selected and displayed on the touch screen 25.

For example, if there is a page screen 500 (FIG. 15 or the like) including all the above four function buttons, the page screen 500 is displayed to replace the advanced settings menu screen 300. Alternatively, if one function button out of the four function buttons whose settings have been changed is disposed on the first page screen 500 and if the remaining three function buttons are disposed on the second page screen 500, the second page screen 500 including the three functions (relatively many functions) is selected and displayed.

According to the third embodiment, if the number of the functions whose settings have been changed using the advanced settings menu screen 300 of the one-line display mode M1 is greater than the predetermined value, the display mode switching process to the grid display mode M2 is automatically performed. Thus, on the screen 500 (FIG. 15) after changing, it is possible to visually confirm simultaneously at least a part of the four function buttons B12, B5, B6, and B7 whose settings have been changed. Therefore, the user can more easily see the state of setting related to the four functions.

In the above third embodiment, if it is determined in step S32 that the number N of the functions whose settings have been changed using the advanced settings menu screen 300 is greater than the predetermined value, the switching process of the display mode (step S35) is immediately performed; however, the present invention is not limited thereto. For example, it is also possible to perform the switching process of the display mode (step S35) under the additional condition that there is a page screen 500 including the N number of function buttons corresponding to the N number of functions whose settings have been changed.

4. Fourth Embodiment

A fourth embodiment is a modified example of the second embodiment. In the following, a description will be made mainly on the difference from the second embodiment.

Also in the fourth embodiment, an aspect will be exemplified in which the display mode switching process is automatically performed. However, the condition and the like under which the display mode switching process is automatically performed are different. In the fourth embodiment, if the user does not perform an operation of selection of the function button during one cycle of reciprocal movement of the scroll operation on the advanced settings menu screen 300 of the one-line display mode M1, the display mode switching process is automatically performed.

Figure 19:
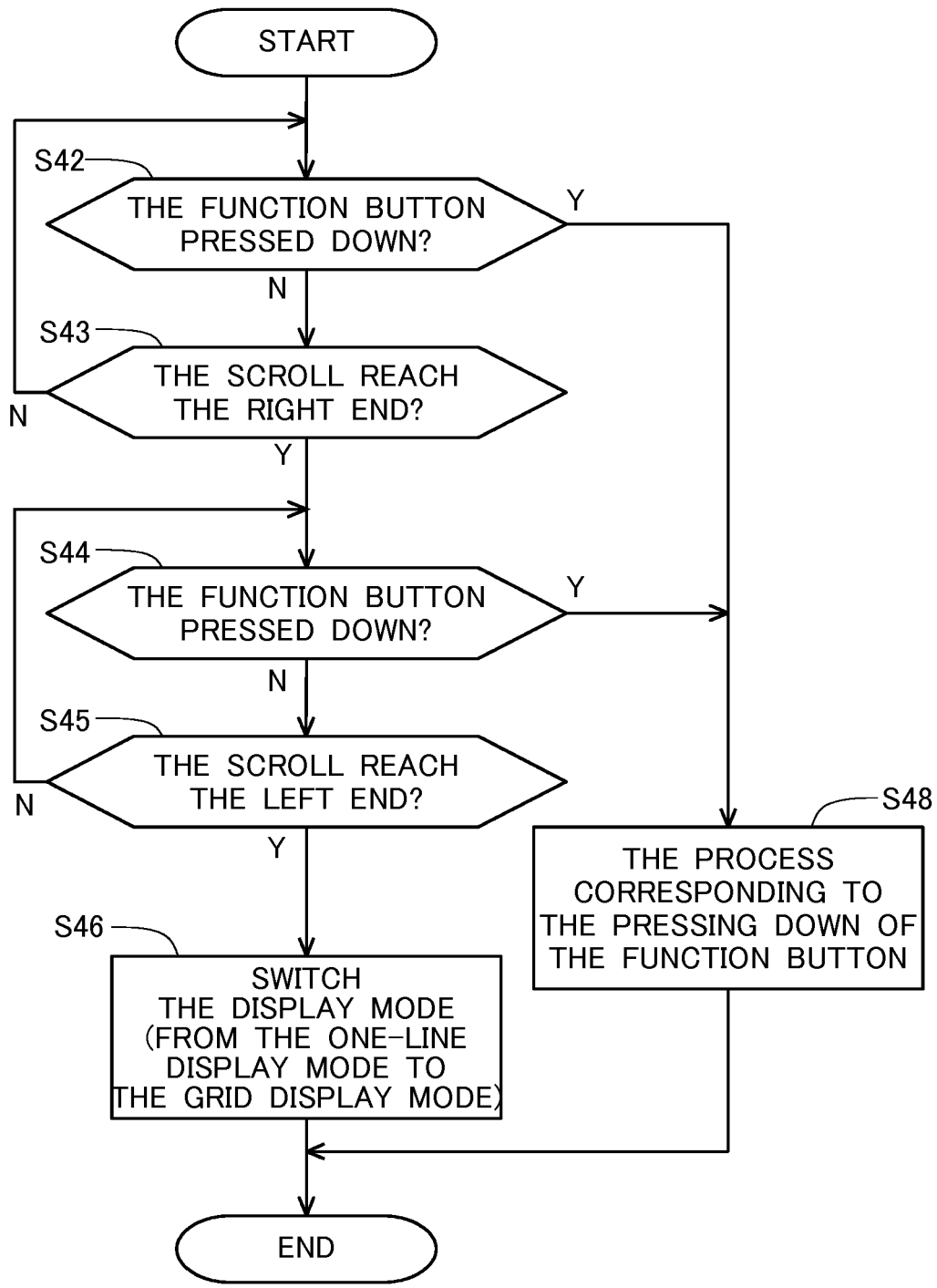
FIG. 19 is a flowchart showing an operation in a fourth embodiment.

FIG. 19 is a flowchart showing an operation of the MFP 10 according to the fourth embodiment. The operation according to this flowchart is performed while the advanced settings menu screen 300 of the one-line display mode M1 (see FIG. 5, FIG. 6, and the like) is displayed. Further, in the one-line display mode M1, the advanced settings menu screen 300 of FIG. 5 is first displayed. On the advanced settings menu screen 300 of FIG. 5, the button (the function button B1 on the left end, here) on one end of the plurality of function buttons Bi arranged in the horizontal direction (in the lateral direction) in the one-line display mode M1 is displayed on the left end of the button display area 310. After that, the display object buttons in the button display area 310 are changed depending on the scroll operation of the user. In the flowchart of FIG. 19, the process for performing the scroll operation is not shown.

In step S42 of FIG. 19, it is determined whether or not any of the function buttons Bi in the advanced settings menu screen 300 has been pressed down.

If it is determined that any of the function buttons Bi has been pressed down, the process proceeds to step S48. In step S48, there is performed a process (for example, a setting process or the like using the detailed settings screen corresponding to the function buttons Bi) corresponding to the pressing down of the function button Bi.

Figure 20:
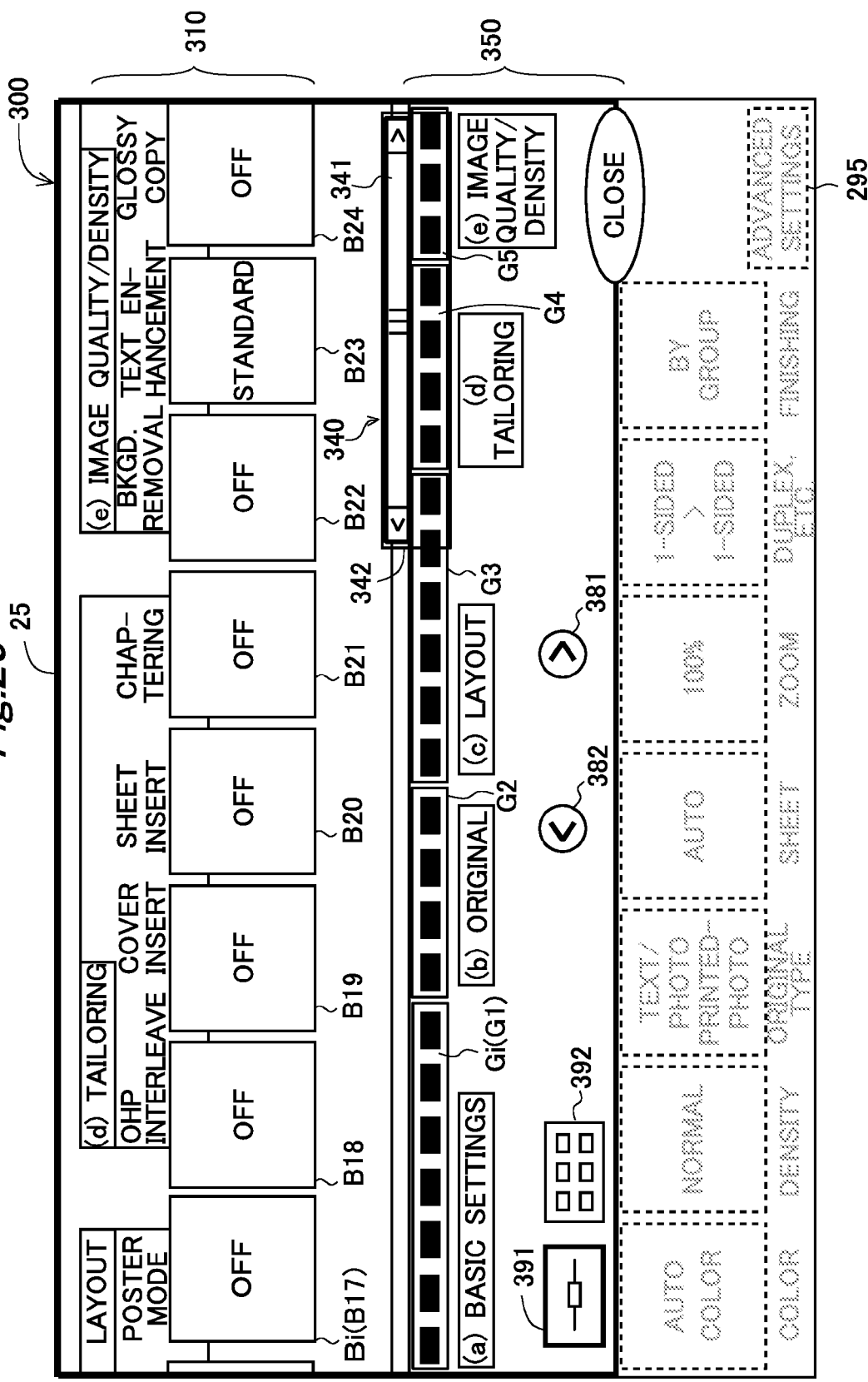
FIG. 20 is a diagram showing the advanced settings menu screen after a scroll operation in the one-line display mode.

On the other hand, if it is determined that none of the function buttons Bi has been pressed down, the process proceeds to step S43. In step S43, it is determined whether or not a transition has been made to a state in which the button (the right end function button B24, here) at the other end of the plurality of function buttons Bi arranged in the horizontal direction (in the lateral direction) in the one-line display mode M1 is displayed at the right end of the button display area 310 (see FIG. 20). FIG. 20 is a diagram showing the state in which the plurality of function buttons have been scrolled to the right end.

If it is determined in step S43 that the transition has not been made to the state in which the right end function button B24 is displayed at the right end of the button display area 310, the process goes back to step S42 again to repeat the same operation. Note that if the user performs a scroll operation during a loop process between step S42 and step S43, a scrolling process is performed with respect to the function buttons Bi in the button display area 310.

On the other hand, if it is determined in step S43 that a transition is made to the state in which the right end function button B24 is displayed at the right end of the button display area 310, the process proceeds to step S44. In other words, if the scrolling has been made to the right end in the button display area 310, the process proceeds to step S44.

In step S44, it is determined whether or not any of the function buttons Bi in the advanced settings menu screen 300 has been pressed down in a similar manner as in step S42.

If it is determined that any of the function buttons Bi has been pressed down, the process proceeds to step S48 to perform a process corresponding to the pressing down of the function button Bi.

On the other hand, it is determined that none of the function buttons Bi has been pressed down, the process proceeds to step S45. In step S45, it is determined whether or not a transition is made to a state in which the left end function button B1 of the plurality of function buttons Bi arranged in the horizontal direction (in the lateral direction) in the one-line display mode M1 is displayed at the left end of the button display area 310.

If it is determined in step S45 that transition is not made to the state in which the left end function button B1 is displayed at the left end of the button display area 310, the process goes back to step S44 again to repeat the same operation. Note that if the user performs a scroll operation during a loop process between step S44 and step S45, a scrolling process is performed with respect to the function buttons Bi in the button display area 310.

On the other hand, if it is determined in step S45 that a transition is made to the state in which the left end function button B1 is displayed in the button display area 310, the process proceeds to step S46. In other words, if the scrolling has been made to the left end of the button display area 310, the process proceeds to step S46.

In step S46, the display mode switching process from the one-line display mode M1 to the grid display mode M2 is performed. Specifically, the advanced settings menu screen 500 of the grid display mode M2 (see FIG. 12) is displayed to replace the advanced settings menu screen 300 (FIG. 5). At this time, it is preferable to display, as the advanced settings menu screen immediately after the switching, the page screen 500 (FIG. 12) including the function buttons B1 to B8 which have been included in the immediately preceding advanced settings menu screen 300 (FIG. 5).

As described above, in the above aspect, if the user does not perform the operation of selection of a function button during the transition from the state in which the left end button B1 of the plurality of function buttons arranged in the horizontal direction in the one-line display mode M1 is displayed via the state in which the right end button B24 in the horizontal direction is displayed in response to the scroll operation with respect to the function buttons and to the state in which the left end button B1 is displayed again in response to the scroll in the reverse direction, the process proceeds to step S46. In other words, if the operation of selection (press-down operation) of the function buttons Bi is not performed even if a scroll operation is performed from the left end to the right end and again from the right end to the left end (to be short, a single back-and-forth scroll operation) in the button display area 310, the process proceeds to step S46. Then, in step S46, the display mode switching process is performed. Specifically, the advanced settings menu screen 500 of the grid display mode M2 is displayed to replace the advanced settings menu screen 300 of the one-line display mode M1.

In this arrangement, if the operation of selection (press-down operation) of the function button is not performed even if such a single back-and-forth scroll operation is performed, it is highly possible that the user could not find out the intended function button.

In detail, the one-line display mode M1 is a display mode in which the visibility at a glance is relatively low, and in the one-line display mode M1, the plurality of function buttons Bi is displayed as the buttons are flowing in response to the scroll operation. Therefore, the possibility of overlooking the intended button is relatively high. In addition, since, in the one-line display mode M1, the display positions of the function buttons are occasionally changed (not fixed) in response to the scroll operation, it is not easy to find out the intended button, based on the memory of the user itself about the position of the intended button.

To address this issue, in this embodiment, if the function button is not pressed down during a single back-and-forth scroll operation, the display mode is changed from the one-line display mode M1 to the grid display mode M2, and the advanced settings menu screen 500 having a relatively high visibility at a glance is displayed. Thus, the user can relatively easily find out the intended function button, and the operability of the user can thus be improved. In particular, the user, which remembers the position of the intended button in the advanced settings menu screen 500, can more easily find out the intended button.

Note that, in the above embodiment, if the operation of selection of the function button is not performed even if a single back-and-forth scroll operation is performed, the display mode switching process is performed; however, the present invention is not limited thereto. For example, the display mode switching process may be performed if the operation of selection of a function button is not performed even if a one-way scroll operation (for example, a (forward) scroll operation from the left end to the right end) is performed.

In more detail, the display mode switching process may be performed if the user does not perform the operation of selection of a function button even if a transition is made from the state in which the button on one end of the plurality of function buttons Bi arranged in the horizontal direction is displayed in the one-line display mode M1 to the state in which the button on the other end in the horizontal direction is displayed in response to the scroll operation with respect to the function buttons. For example, all of the processes of the flowchart in FIG. 19 except steps S44 and S45 only have to be performed. In more detail, if it is determined in step S43 that a (one-way) scroll operation from the left end to the right end is performed, the process may directly proceed to step S46.

5. Others

The embodiments of the present invention have been described above; however, the present invention is not limited to the above-described contents.

For example, in the first embodiment, there has been exemplified the aspect in which, if the mode switching button 591 is pressed down while the detailed settings screen 600 (FIG. 14) of the grid display mode M2 is displayed, the advanced settings menu screen 300 (FIG. 5) in the initial state is displayed immediately after the mode is switched to the one-line display mode M1. However, the present invention is not limited to that aspect.

Specifically, if the mode is switched to the one-line display mode M1 in response to the pressing down of the mode switching button 591 while the detailed settings screen 600 (FIG. 14) related to the specific function "Booklet" is displayed in the grid display mode M2, it is also possible to continue, immediately after the switching, the setting by using the detailed settings screen 400 (FIG. 7) related to the same function (such specific function) for the one-line display mode M1. Further, after the setting is completed by using the detailed settings screen 400 for the one-line display mode M1, it is also possible to display the function button B12 corresponding to such specific function in the button display area 310 as shown in FIG. 6.

In the following, the above aspect will be described with reference to a flowchart of FIG. 21. The operation according to this flowchart is repeatedly performed by the MFP 10 while the detailed settings screen 600 related to a specific function ("Booklet" or the like), in more detail, the detailed settings screen 600 (see FIG. 14 or the like) related to the specific function ("Booklet" or the like) is displayed. FIG. 14 shows the detailed settings screen 600 related to the function "Booklet" as described above.

If, in step S52, it is determined that the mode switching button 591 has been pressed down, the process proceeds to step S53. In other words, when the instruction of switching to the one-line display mode M1 is received in response to the pressing down of the mode switching button 591, the process proceeds to step S53.

In step S53, it is determined whether or not the detailed settings screen 600 has been displayed immediately before the pressing down of the mode switching button 591.

If it is determined that the detailed settings screen 600 has not been displayed (in other words, the advanced settings menu screen 500 has been displayed) immediately before the pressing down of the mode switching button 591, the process proceeds to step S55. In step S55, the mode is switched to the one-line display mode M1, and the advanced settings menu screen 300 (FIG. 5) in the initial state is displayed immediately after the switching.

On the other hand, if it is determined that the detailed settings screen 600 has been displayed immediately before the mode switching button 591, the process proceeds to step S54.

In step S54, the mode is switched to the one-line display mode M1, and the setting by using the detailed settings screen is continued.

Immediately after the switching, the detailed settings screen 400 (FIG. 7) related to the same function "Booklet" is first displayed. At this time, as shown in FIG. 7, behind the pop-up displayed detailed settings screen 400, the advanced settings menu screen 300 is also displayed. In the button display area 310 (in detail, at the left end position of the button display area 310) of this advanced settings menu screen 300, the function button B12 corresponding to the function "Booklet," which is being set, is displayed. In other words, the function button B12 corresponding to the function "Booklet" is included as one of the display object function buttons in the button display area 310. Note that, in the aspect exemplified here, the detailed settings screen 400 of FIG. 7 is displayed immediately after the mode is switched to the one-line display mode M1; however, the present invention is not limited to this aspect, and, for example, the detailed settings screen 400 as shown in FIG. 8 or FIG. 9 may be displayed immediately after the mode is switched to the one-line display mode M1.

After that, when the OK button 432 in the detailed settings screen 400 is pressed down and the setting by using the detailed settings screen 400 is completed, the detailed settings screen 400 is removed. As a result, as shown in FIG. 6, the advanced settings menu screen 300 hidden behind the detailed settings screen 400 is displayed in the front side. In this way, after the setting by using the detailed settings screen 400 for the one-line display mode M1 is completed, there is displayed the advanced settings menu screen 300 which includes the function button B12 corresponding to the function "Booklet" as one of the display object function buttons in the button display area 310.

As described above, when the display mode is changed, during a setting operation, to the one-line display mode M1, the function button corresponding to the function under the setting operation is displayed in the button display area 310; thus, the user can have a feeling of a continuous operation. As a result, the user's operability can be improved.

In addition, with respect to the switching of the display mode in the opposite direction, a similar modification may be made.

For example, if the mode is switched to the grid display mode M2 in response to the pressing down of the mode switching button 392 while the detailed settings screen 400 (FIG. 7) related to the function "Booklet" is displayed in the one-line display mode M1, it is also possible to continue, immediately after the switching, the setting by using the detailed settings screen 600 (FIG. 14) related to the same function "Booklet" for the grid display mode M2. In addition, after the setting is completed by using the detailed settings screen 600 for the grid display mode M2, it is also possible to display, in a grid-like manner, the function buttons B1 to B15 including the function button B12 corresponding to the function "Booklet" (see FIG. 12).

In this way, in the case that the display mode is changed, during the setting operation, to the grid display mode M2, a function button corresponding to the function under the setting operation is displayed in the button display area 510 (FIG. 12); therefore, the user can have a feeling of a continuous operation. As a result, the user's operability can be improved.

In addition, the detailed settings screen 400 (FIG. 7) of the one-line display mode M1 and the detailed settings screen 600 (FIG. 14) of the grid display mode M2 have the same shape, size, and the like except the projecting section (the figure section indicating the relationship between the detailed settings screen and the setting object function button) of the detailed settings screen 400 and have the same setting area and the like. In other words, the two setting screens are different in that the detailed settings screen 400 has the projecting section but the detailed settings screen 600 does not have such a projecting section; however, the two screens are the same in other respects. That is, the detailed settings screens 400 and 600 have almost the same outer appearance. Therefore, the user can have a uniform operation feeling before and after switching between the display modes M1 and M2.

Further, in the above embodiments or the like, the function buttons Bi as the display object are disposed on the upper side in the screen in the one-line display mode M1, and the detailed settings screen is displayed mainly under the function buttons Bi; however, the present invention is not limited thereto. For example, each element may be disposed to be vertically reversed. In more detail, in the one-line display mode M1, the function buttons Bi as the display object may be on the lower side in the screen, and the detailed settings screen may be displayed mainly above the function buttons Bi.

Further, in the above embodiments or the like, there has been exemplified the aspect in which the plurality of function buttons Bi are arranged in an order (in detail, a predetermined order based on the grouping) unique to the device on the advanced settings menu screen 500 of the grid display mode M2 (FIG. 12 and FIG. 13); however, the present invention is not limited thereto. For example, the function buttons Bi may be arranged not in the order unique to the device but the order customized by the user. Specifically, the function buttons Bi on the advanced settings menu screen 500 may be arranged at unique positions customized for each user. In this case, the user can relatively easily memorize the positions, of the function buttons Bi on the advanced settings menu screen 500, customized by him or her.

In addition, in the above embodiments or the like, the advanced settings menu screen is displayed after the basic settings menu screen 200 is once displayed immediately after the power-on of the MFP 10; however, the present invention is not limited thereto. For example, a switching process may be performed between the both display modes M1 and M2, depending on a manual operation or automatically after the advanced settings menu screen is displayed, immediately after the power-on, in either of the two types of display modes M1 and M2.

In addition, in the above embodiments or the like, there has been exemplified the aspect in which the display operation of the touch screen 25 of the MFP 10 is controlled by a computer embedded in the MFP 10; however, the present invention is not limited thereto. For example, a program for remotely operating the MFP 10 may be executed on a computer embedded in an external terminal (tablet terminal or the like) communicable with the MFP 10. In this arrangement, the operation related to the MFP 10 may be performed, depending on the remote operation performed on the external terminal. In more detail, there is displayed on the tablet terminal a screen (the above menu screens 300 and 500 and the detailed settings screens 400 and 600, and the like) similar to the touch screen 25 of the MFP 10, and the operation content corresponding to the screen is transmitted from the tablet terminal to the MFP 10 though a communication line. With the communication process described above, the MFP 10 may be remotely operated.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus comprising:
    a display unit configured to display a menu screen for setting; and
    a controller configured to switch a display mode of the menu screen between a first display mode and a second display mode,
    wherein, on a first menu screen which is the menu screen of the first display mode, the controller (i) determines as display object function buttons a part of function buttons of a plurality of function buttons used to call up each of detailed settings screens each related to each of a plurality of functions provided in the image forming apparatus, (ii) displays the display object function buttons to be arranged in a row in a predetermined direction and grouped in different groups according to a particular function setting, and (iii) changes and displays the display object function buttons according to a scroll operation performed by a user, and
    on a second menu screen which is the menu screen of the second display mode, the controller displays at least some of function buttons of the plurality of function buttons undivided by group so that the function buttons in different groups are viewable on the second menu screen, and so that the plurality of function buttons are arranged in a grid-like manner in which the displayed function buttons are arranged in a plurality of rows, wherein more than one of the function buttons are included in each row, and each of the function buttons displayed in the grid-like manner is displayed in its entirety, wherein the controller displays the second menu screen to replace the first menu screen after a function button related to a booklet function is selected as a setting object function button and is pressed down by the user on the first menu screen and after a setting operation is performed by using one of the detailed settings screens corresponding to the setting object function button, under a condition that there have not been concurrently displayed on the immediately preceding first menu screen two or more function buttons corresponding to two or more functions whose settings have been changed in association with the setting operation and which include the booklet function, and a duplex print output function whose settings have been automatically changed in response to the setting operation.

2. The image forming apparatus of claim 1, wherein, on the second menu screen, each of the function buttons is disposed at each unique position in the grid-like arrangement.

3. The image forming apparatus of claim 2, wherein, on the second menu screen, the plurality of function buttons are disposed to be distributed in a plurality of pages, and each of the function buttons disposed in each of the plurality of pages is displayed at a unique position in each of the plurality of pages.

4. The image forming apparatus of claim 1, wherein when any one of the buttons is selected as the setting object function button and is pressed down by the user on the second menu screen, the controller displays one of the detailed settings screens corresponding to the setting object function button at a common predetermined position independent of which button is selected as the setting object function button.

5. The image forming apparatus of claim 1, wherein when any one of a part of function buttons is selected as the setting object function button and pressed down by the user on the first menu screen, the controller pop-up displays one of the detailed settings screens which corresponds to the setting object function button, has a figure section indicating that the one of the detailed settings screens relates to the setting object function button, and is displayed so that the selected setting object function button is not hidden.

6. The image forming apparatus of claim 5, wherein the figure section has a projecting section which is close to or in contact with the setting object function button.

7. The image forming apparatus of claim 1, wherein the controller performs the display mode switching process in response to a press-down operation of a mode switching button provided in a currently displayed menu screen of two menu screens, which are the first menu screen and the second menu screen.

8. The image forming apparatus of claim 7, wherein when the mode switching button is pressed down while one of the detailed settings screens related to a specific function is being displayed in the second display mode, the controller displays, immediately after switching to the first display mode, one of the detailed settings screens which is for the first display mode and is related to the specific function, and after the setting is completed by using the one of the detailed settings screens for the first display mode, the controller displays the first menu screen including the function button corresponding to the specific function as one of the display object function buttons.

9. The image forming apparatus of claim 7, wherein when the mode switching button is pressed down while one of the detailed settings screens related to a specific function is being displayed in the first display mode, the controller displays, immediately after switching to the second display mode, one of the detailed settings screens which is for the second display mode and is related to the specific function, and after the setting is completed by using the one of the detailed settings screens for the second display mode, the controller displays at least the part of function buttons including the function button corresponding to the specific function to be arranged in the grid-like manner.

10. The image forming apparatus of claim 1, wherein when any one of the part of function buttons is selected as the setting object function button and is pressed down by the user on the first menu screen, the controller pop-up displays, as one of the detailed settings screens for the first display mode, one of the detailed settings screens which corresponds to the setting object function button and has a figure section indicating that the one of the detailed settings screens relates to the setting object function button, in such a manner that the one of the detailed settings screens is displayed so as not to hide the setting object function button, when any one of the buttons is selected as the setting object function button and is pressed down by the user on the second menu screen, the controller pop-up displays, as one of the detailed settings screens for the second display mode, one of the detailed settings screens corresponding to the setting object function button at a common predetermined position independent of which button is selected as the setting object function button, when the mode switching instruction to the second display mode is received while one of the detailed settings screens, for the first display mode, related to a specific function is being displayed in the first display mode, the controller displays, immediately after switching to the second display mode, one of the detailed settings screens which is for the second display mode and is related to the specific function, when the mode switching instruction to the first display mode is received while one of the detailed settings screens, for the second display mode, related to the specific function is being displayed in the second display mode, the controller displays, immediately after switching to the first display mode, one of the detailed settings screens which is for the first display mode and is related to the specific function, and the detailed settings screens for the first display mode and the detailed settings screens for the second display mode have a same shape and size except the figure section.

11. The image forming apparatus of claim 1, wherein the controller displays the second menu screen to replace the first menu screen after any one of the part of function buttons is selected as the setting object function button and is pressed down by the user on the first menu screen and after the setting operation is performed by using one of the detailed settings screens corresponding to the setting object function button, under the condition that there have not been concurrently displayed on the immediately preceding first menu screen two or more function buttons corresponding to two or more functions whose settings have been changed in association with the setting operation and which include a function whose settings have been automatically changed in response to the setting operation.

12. The image forming apparatus of claim 11, wherein also under the condition that a page screen on the second menu screen includes the two or more function buttons, the controller displays the page screen on the second menu screen to replace the first menu screen.

13. The image forming apparatus of claim 11, wherein after there is performed the setting operation by using the one of the detailed settings screens corresponding to the setting object function button selected on the first menu screen, the controller attaches marks, which indicate that the settings have been changed, to all of the two or more function buttons on the second menu screen.

14. The image forming apparatus of claim 1, wherein the controller displays the second menu screen to replace the first menu screen after any one of the part of function buttons is selected as the setting object function button and is pressed down by the user on the first menu screen and after the setting operation is performed by using one of the detailed settings screens corresponding to the setting object function button, under the condition that it is impossible to concurrently display two or more function buttons on the first menu screen without scrolling, the two or more function buttons corresponding to two or more functions whose settings have been changed in association with the setting operation, the two or more functions including a function whose settings have been automatically changed in response to the setting operation.

15. The image forming apparatus of claim 1, wherein when a number of functions whose settings have been changed by using the first menu screen exceeds a predetermined value, the controller displays the second menu screen to replace the first menu screen.

16. The image forming apparatus of claim 1, wherein when the function button is not selected by the user during a transition from a state that a button on one end of the plurality of function buttons arranged in the predetermined direction in the first display mode is displayed, through the state that the button on the other end of the predetermined direction is displayed in response to the scroll operation with respect to the function buttons, and to the state that the button on the one end is displayed again in response to the scroll operation in an opposite direction, the controller performs the display mode switching process and displays the second menu screen to replace the first menu screen.

17. The image forming apparatus of claim 1, wherein when the function button is not selected by the user during a transition from a state that a button on one end of the plurality of function buttons arranged in the predetermined direction in the first display mode is displayed to the state that the button on the other end of the predetermined direction is displayed in response to the scroll operation with respect to the function buttons, the controller performs the display mode switching process and displays the second menu screen to replace the first menu screen.

18. The image forming apparatus of claim 1, wherein the function buttons on the first menu screen are displayed in a same size as the function buttons on the second menu screen.

19. The image forming apparatus of claim 1, wherein the second menu screen is configured to display a larger number of function buttons than a number of display object function buttons concurrently displayed on the first menu screen.

20. The image forming apparatus of claim 1, wherein the second menu screen displays two or more groups of function buttons among a plurality of groups into which the function buttons are classified depending on their respective functions.

21. A non-transitory computer-readable recording medium storing a program for causing a computer to execute the steps of:
(a) displaying a menu screen for configuring settings related to an image forming apparatus in one display mode of two display modes which are a first display mode and a second display mode; and
(b) switching a display mode of the menu screen from the one display mode to the other display mode of the two display modes,
wherein, on a first menu screen which is a menu screen of the first display mode, (i) a part of function buttons of a plurality of function buttons used to call up each of detailed settings screens each related to each of a plurality of functions provided in the image forming apparatus are determined as display object function buttons, (ii) the display object function buttons are displayed to be arranged in a row in a predetermined direction and grouped in different groups according to a particular function setting, and (iii) the display object function buttons are changed and displayed according to a scroll operation performed by a user, and
on a second menu screen which is the menu screen of the second display mode, at least some of function buttons of the plurality of function buttons are displayed undivided by group so that the function buttons in different groups are viewable on the second menu screen, and so that the plurality of function buttons are arranged in a grid-like manner in which the displayed function buttons are arranged in a plurality of rows, wherein more than one of the function buttons are included in each row, and each of the function buttons displayed in the grid-like manner is displayed in its entirety,
wherein the controller displays the second menu screen to replace the first menu screen after a function button related to a booklet function is selected as a setting object function button and is pressed down by the user on the first menu screen and after a setting operation is performed by using one of the detailed settings screens corresponding to the setting object function button, under a condition that there have not been concurrently displayed on the immediately preceding first menu screen two or more function buttons corresponding to two or more functions whose settings have been changed in association with the setting operation and which include the booklet function, and a duplex print output function whose settings have been automatically changed in response to the setting operation.

* * * * *